United States Patent
Moss et al.

(10) Patent No.: US 8,793,463 B2
(45) Date of Patent: Jul. 29, 2014

(54) ALLOCATION STRATEGIES FOR STORAGE DEVICE SETS

(75) Inventors: Darren Moss, Redmond, WA (US);
Karan Mehra, Sammamish, WA (US);
Emanuel Paleologu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 13/230,505

(22) Filed: Sep. 12, 2011

(65) Prior Publication Data

US 2013/0067187 A1 Mar. 14, 2013

(51) Int. Cl.
*G06F 3/06* (2006.01)
*G06F 12/06* (2006.01)
*G06F 12/02* (2006.01)

(52) U.S. Cl.
CPC .......... *G06F 3/0644* (2013.01); *G06F 12/0646* (2013.01); *G06F 12/023* (2013.01)
USPC ............ 711/170; 711/112; 711/114; 711/156

(58) Field of Classification Search
CPC .. G06F 3/0644; G06F 12/0646; G06F 12/023
USPC ................... 711/170, 112, 114, 156
See application file for complete search history.

(56) References Cited

U.S. PATENT DOCUMENTS 7,143,263 B2 * 11/2006 Anand et al. .................. 711/171
7,234,008 B1 * 6/2007 Russ .............................. 710/52
7,325,120 B2 1/2008 Sawdon et al.
7,363,454 B2 4/2008 Cannon et al.
7,475,214 B2 * 1/2009 Hwang ......................... 711/170
7,694,043 B2 * 4/2010 Russ .............................. 710/52
7,809,914 B2 * 10/2010 Kottomtharayil et al. .... 711/170

(Continued)

FOREIGN PATENT DOCUMENTS

CN 102929787 A 2/2013

OTHER PUBLICATIONS

"Diverse redundancy used in SIS technology to achieve higher safety integrity", Edgar C. Ramirez, May 8, 2008, printed from the Internet at: https://www.google.com/search?sourceid=navclient&aq=&oq=&ie=UTF-8&rlz=1T4ADRA_enUS455US456&q=diverse+redundancy+used+in+sis+technology+to+achieve+higher+safety+integrity&gs_l=hp..0.411669.0.0.0.3812...........0, 9 pgs.

(Continued)

*Primary Examiner* — Stephen Elmore
(74) *Attorney, Agent, or Firm* — John Jardine; Andrew Sanders; Micky Minhas

(57) ABSTRACT

A storage device set may allocate capacity for spaces (e.g., logical volumes) according to an allocation strategy, e.g., allocating capacity from the storage device having the greatest available capacity, or maximizing the distribution of allocated capacity across the storage devices. However, such allocation strategies may be inefficient (e.g., limiting the capability of the storage device set to satisfy subsequent requests with constraints such as a minimum distribution of capacity across several storage devices). The techniques presented herein achieve efficient allocation by first allocating capacity on storage devices having ample available capacity using a round-robin technique, and if such storage devices do not satisfy the capacity request, allocating capacity on storage devices having limited available capacity. Additionally, the techniques presented herein facilitate thin provisioning through capacity reservations, wherein storage devices withhold unallocated storage for particular spaces that may be utilized as a reserve if unreserved capacity is exhausted.

20 Claims, 10 Drawing Sheets

(56) References Cited

U.S. PATENT DOCUMENTS

| | | | | |
|---|---|---|---|---|
| 8,074,042 | B2* | 12/2011 | Kottomtharayil et al. | 711/170 |
| 8,504,787 | B1* | 8/2013 | Graves et al. | 711/162 |
| 2008/0115017 | A1 | 5/2008 | Jacobson | |

OTHER PUBLICATIONS

"Thin provisioning for more efficient storage", Mar. 9, 2011, reprinted from the Internet at: http://h20338.www2.hp.com/enterprise/us/en/messaging/feature-sftwr-storage-thinprovisioning.html. 2 pgs.

"SANRAD", Apr. 23, 2006, reprinted from the Internet at: http://www.av-digital.com/storagepooling.html, 2 pgs.

"Symmetrix Virtual Provisioning", Mar. 9, 2011, reprinted from the Internet at: http://www.emcstorageinfo.com/2009/04/symmetrix-virtual-provisioning.html, 3 pgs.

"Proactively Preventing Data Corruption", Martin Petersen, Jan. 3, 2008, reprinted from the Internet at: http://oss.oracle.com/~mkp/docs/ppdc.pdf, pp. 1-6.

* cited by examiner

ALLOCATION STRATEGIES FOR STORAGE DEVICE SETS

BACKGROUND

Within the field of computing, many scenarios involve a storage device set comprising a set of storage devices that are configured to store data sets on behalf of various processes. The storage capacity of the storage devices may be manifested on computer systems as a set of logical volumes, and the interoperation of the storage devices may enable more variations than independently operating storage devices; e.g., the entire storage capacity may be manifested a single logical volume, regardless of which storage device contains a particular data set, or a set of logical volumes may be generated with an arbitrary relationship with the storage devices upon which the capacity for a particular logical volume is physically located. The interoperation of the storage devices may also provide additional features, such as automated storage redundancy that may provide data recovery and availability in case a storage device of the storage device set becomes inaccessible; error detection and/or correction through automated checksum calculation that may enable recoveries from data corruption or reconstruction of lost data; and parallel access to a data set through a plurality of storage devices that may provide greater throughput to a storage device set than access through a single storage device.

In some of these scenarios, access to the storage device set may be provided as a set of spaces (respectively representing, e.g., a logical volume, a storage journal, or a metadata set facilitating the maintenance of the storage device set), for which a set of extents have been physically allocated on the storage devices. For example, the capacity of each storage device may be apportioned into extents of a consistent or variable size, and when capacity is requested for a space, one or more extents may be physically allocated on one or more storage devices, and each extent may be bound to a logical address range for the space. An access to a location within the logical address range may be satisfied by reference to an extent that has been physically allocated for the space and bound to a logical address range including the location of the access.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computing scenarios involving a storage device set, requests for allocations of capacity (e.g., the allocation of extents for respective spaces) may be fulfilled by selecting one or more storage devices and physically allocating one or more areas. However, the particular selection of storage devices may vary among implementations. For example, a storage controller may arbitrarily select a storage device for the allocation; may simply allocate a suitably sized area on the storage device having the greatest available capacity; may utilize a best-fit technique; or may select allocations of an equal size on all storage devices of the storage device set. These strategies may present respective advantages; e.g., a best-fit technique may reduce data fragmentation, while a distribution across all storage devices may improve the access rate to a data set stored in the distributed allocation.

In more complex storage scenarios, data sets may be the storage devices according to a constraint. For example, storage for a first data set, comprising valuable or high-demand data, may be requested with a maximum distribution across the storage devices (e.g., a mirroring of data on several storage devices to provide improved redundancy, or an automated calculation and storage of checksums for the data set that enable error detection and/or error correction). Storage for a second data set may requested with the constraint of a contiguous block of data, e.g., in order to improve sequential access to the data set through the use of read-ahead and burst access features of the storage devices. Conversely, storage for a third data set may not specify any constraint, and may be stored in any location of the storage device set. Additional features may also be provided by the storage device set, such as delayed capacity allocation (e.g., a request to provision capacity for a space may not promptly allocate all of the extents to satisfy the capacity of the space, but may simply record the provisioned size and bind extents to the space on a just-in-time basis) and thin provisioning (e.g., spaces may be created with provisioned capacity exceeding the physical capacity of the storage device set, and as the available capacity of the storage device set nears exhaustion, the storage device set may advise an administrator to provide additional storage devices to extend the physical capacity of the storage device set).

However, in view of these features, comparatively simple allocation strategies may inefficiently allocate the capacity of the storage device set in view of these requests, and may later have to reorganize the storage device set in order to satisfy the constraints of new data sets. As a first example, some storage strategies may lead to uneven allocation of the storage capacities the respective storage devices; e.g., a greater proportion of storage device sets may be allocated on a particular storage device than other storage devices, thereby consuming its capacity at a greater rate and resulting in an earlier exhaustion of the capacity of that storage device as the storage device set nears capacity. This early exhaustion may present a problem if a subsequent write request specifies that a data set is to be maximally allocated over the storage devices of the storage device set. In this case, the storage device set may have plenty of storage capacity to satisfy the request, but may have to relocate some data from the exhausted storage device in order to satisfy the distribution constraint. As a second example, if the storage devices present different available capacities (e.g., due to different physical capacities or other, uneven allocations of capacity), an even allocation of capacity across the storage devices may exhaust a storage device having less available capacity before a storage device having greater available capacity. As a third example, it may be desirable to utilize thin provisioning to enable spaces to grow to a provisioned capacity, but when the capacity of the storage device set is exhausted, additional capacity becomes unavailable for all overprovisioned spaces. However, some spaces may have higher priority than other spaces, and it may be undesirable to enable an overprovisioned but lower-priority space to consume capacity to the point of exhaustion, thereby causing an unavailability of capacity for an overprovisioned and higher-priority space. If the storage device set does not provide any features for avoiding this result, the only viable option may be to reduce or avoid thin provisioning of the storage device set in order to ensure that capacity is available when needed.

Presented herein are techniques for configuring storage device sets to fulfill requests to allocate capacity that may reduce or avoid some of these problems. In accordance with these techniques, when a request to allocate capacity is received, the storage device set may examine the storage devices to identify a subset of storage devices having ample available capacity, i.e., storage devices having available capacity above an available capacity minimum threshold, and may first allocate capacity on the storage devices of this spacious storage device subset. If this allocation is insufficient to satisfy the allocation request (e.g., if the allocation request specifies an allocation of capacity on four storage device, but only two storage devices have ample storage capacity, then the storage device set may next identify a subset of storage devices having less than the available capacity minimum threshold, but that still have available capacity (i.e., those that are not yet exhausted), and may allocate capacity on these storage devices. This technique may provide a comparatively simple technique for selecting storage devices to allocate capacity, while also preserving capacity on storage devices for which available capacity is becoming limited. As a second example, among the storage devices of the selected storage device subset, various strategies may be utilized to distribute the allocations of capacity (e.g., the allocation of extents) across the storage devices of the subset, such as a round-robin allocation strategy that distributes the allocation over the storage devices; a capacity utilization allocation strategy that maximizes the allocation of the storage device having the greatest available capacity; and an access rate allocation that distributes allocations to storage devices that have exhibited less frequent accesses, which may more evenly distribute the access load and improve the throughput of the storage device set.

An additional feature that may be utilized with these techniques involves capacity reservations. For a particular space, a specified amount of capacity may be reserved on the storage devices; even though capacity is not allocated for the space, respective storage devices may set aside some available capacity for the space, and may thereby withhold the reserved capacity from other capacity requests. For example, if a storage device comprises 1,000 extents (e.g., 1 GB extents for a storage device having 1 TB of capacity), a space may be created with a capacity reservation resulting in a reservation of 100 extents on the storage device. The storage device may therefore indicate only 900 extents of capacity available for other capacity requests, and even though no particular extents have been allocated for the space having the capacity reservation, 100 extents remain available for the space even if the available capacity is exhausted. The use of capacity reservations may enable the reservation of capacity for spaces even in the event of capacity exhaustion; e.g., even if another overprovisioned and low-priority space (not having a capacity reservation) exhausts the available capacity of the storage device set (and can no longer request allocations of capacity), capacity may remain available for an overprovisioned and higher-priority space for which a capacity reservation has been created, even if such capacity is not yet allocated in the form of extents.

Moreover, these variations may be combined to present an even more adept allocation strategy. For example, while determining whether the available capacity of particular storage device is ample or limited (e.g., whether the available capacity of a storage device is above or below an available capacity minimum threshold), an embodiment of these techniques may include in this determination the capacity reservations of the storage device. For example, a storage device having an available capacity of 1,000 extents may comprise 500 extents that are currently in use, and might therefore be considered spacious in view of an available capacity minimum threshold of 250 extents, but may be considered of limited capacity if comprising capacity reservations totaling 400 extents. These and other variations of the techniques presented therein may be included in an allocation strategy that utilizes the capacity of the storage device set in a flexible and efficient manner.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
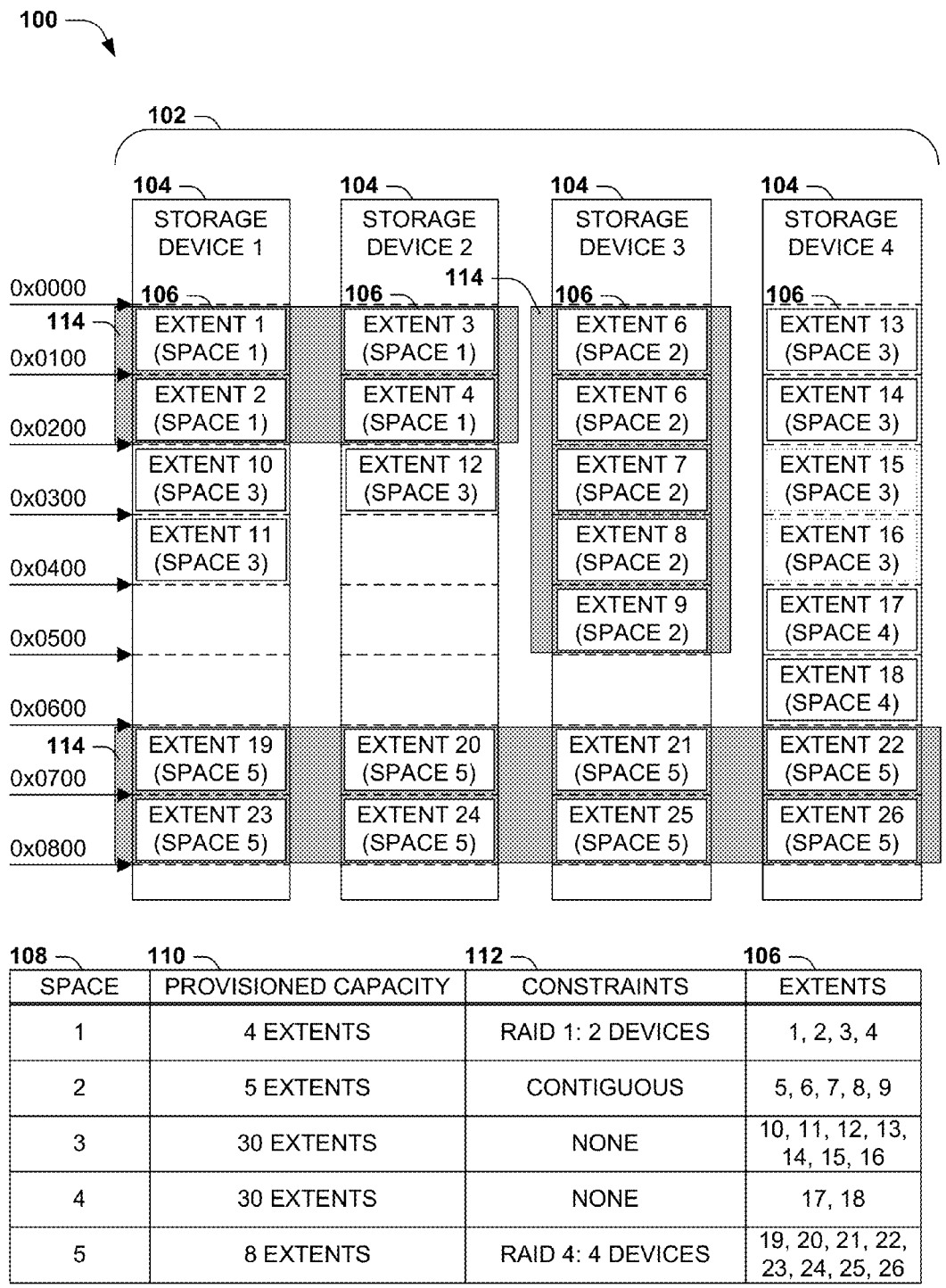
FIG. 1 is an illustration of an exemplary scenario featuring capacity allocations of respective storage devices of a storage device set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a storage device set comprising a set of storage devices, such as hard disk drives, solid-state storage devices, tape backup archives, and volatile or non-volatile memory circuits. The storage devices may be of homogenous or heterogeneous types; may present similar or varying characteristics such as capacity, volatility; may be tightly or loosely aggregated through hardware or software (e.g., a set of hard disk drives inserted in a Redundant Array of Inexpensive Disks (RAID) controller, or a software process interacting with a variety of storage devices); and may be present in the same location, in a local area (e.g., a set of network-attached storage (NAS) devices), and/or in a wide area (e.g., a geographically distributed set of storage devices accessed over the internet).

The storage device set may be configured to fulfill requests to allocate storage capacity on behalf of various processes executing on one or more devices. In many such scenarios, the storage device set manifests one or more logical volumes, each of which may be formatted in a particular manner (e.g., a file store formatted according to a file system or a database formatted according to a database storage system). In earlier storage device sets, each logical volume was limited to a particular storage device; however, in contemporary storage device sets, two or more storage devices may interoperate as a pool of capacity for a single logical volume. For example, two or more storage devices may pool some or all physical capacity as a single logical volume. Therefore, the storage device set may exhibit a set of logical volumes having an arbitrary relationship with the physical capacity of the storage devices of the storage device set; e.g., a logical volume may seamlessly aggregate capacity from several storage devices, and may store data represented at a particular logical location at any physical location within the allocated capacities of the storage devices participating in the pool.

The storage device set may satisfy requests to allocate capacity in various ways. In earlier storage device sets, a request to create a logical volume was fulfilled by allocating a block of physical capacity on a storage device (e.g., a large, contiguous block of space within a partition). However, contemporary storage device sets may provide a large amount of capacity (e.g., an entire petabytes of storage), and may be allocated into a large number of logical volumes (e.g., respective logical volumes for the operating environments of a large number of virtual machines). Moreover, such requests may be initiated at different times, and may involve requests to expand, reduce, or relocate the capacity. In order to support this type of dynamic environment, it may be desirable to configure the storage device set to allocate capacity in a more flexible manner. As one such example, the storage device set may be organized as a set of spaces representing various area of data storage (e.g., a logical volume; a checksum area; a storage journal where changes to another space may be recorded; or a maintenance area that stores metadata about other spaces), and as a set of extents, comprising small physical allocations that may be associated with a space. The storage device may fulfill a request to create capacity for a space by allocating one or more extents and binding each extent to a logical address range of the space. Requests to access a location within the space are then fulfilled by identifying the extent bound to a logical address range including the location and accessing the extent at the corresponding offset. It is to be appreciated that although the present disclosure presents concepts in the context of a space and extent allocation model, the present techniques may be applicable to storage devices using many organization models.

In addition, the storage device set may provide many features that improve the performance and/or reliability of the storage device set. As a first example, the storage device set may be configured to store one or more data sets in a redundant manner on the same or different storage devices; e.g., in a RAID 1 array, a logical volume is identically replicated over several storage devices. This replication may improve the reliability of the logical volume; e.g., if a storage device becomes corrupt, inaccessible, or unavailable, no data is lost, and the data remains accessible on other storage devices. Additionally, the replication may improve the access rate of the replicated data set by combining the input/output capacities of multiple storage devices. As a second example, the storage device set may be configured to calculate and store checksums for stored data sets. For example, in a RAID 4 array, some storage capacity is allocated not for user data, but to store checksums for user data in other portions of the array; e.g., for each set of four words written to four sequential logical addresses, the storage device set may automatically compute a checksum and store the checksum in the checksum area. This checksum may be used to verify the integrity of the data; to identify the location in the four-word set of an error (e.g., an inadvertently changed bit, or a bit incorrectly read from the physical medium), and optionally to correct the error; and/or to reconstruct data that becomes inaccessible or missing (e.g., the four words may be distributed across four storage devices and the checksums may be written to a fifth storage device, and if any storage device becomes corrupted, fails to respond, or is removed, the data that was stored on the storage device may be reconstructed using the corresponding words and the checksum stored on the other storage devices of the storage device set).

Additional variations of the storage device set involve a decoupling of the provisioning of capacity (e.g., the creation of a space with a provisioned size) and the allocation of capacity, i.e., the selection, reservation, and initialization of portions of the physical media for particular uses. As an example in the context of storage organized as extents bound to spaces, instead of allocating the entire capacity for a space upon creation of the space, which may take a while (particularly for large spaces involving a large number of extents), the storage device set may delay the binding of extents to the space. The storage device set may initially create the space with a provisioned capacity but few or no bound extents. Upon receiving a request to access a location of the space, the storage device set may determine whether any extent is bound to a logical address range including the location, and if not, may promptly allocate an extent on a storage device and bind the extent to a logical address range including the location. This just-in-time allocation may therefore accelerate the creation and size adjustments of the space. Moreover, in such scenarios, the storage device set may be "thinly provisioned," i.e., by creating spaces that together have a provisioned capacity that is greater than the available capacity of the storage device set. As the spaces are accessed, the storage device set may allocate extents for the spaces from the available capacity of the storage devices; and as the available capacity approaches exhaustion, the storage device set may advise an administrator to add one or more storage devices to the storage device set in order to provide additional capacity to satisfy the overprovisioned spaces. Such techniques may be advantageous, e.g., where a large storage device set comprises a large number of spaces that are incrementally filled with data and/or that remain partially unused, such as a storage array with a petabyte capacity storing logical volumes for a large number of virtual machines; in such scenarios, rather than acquiring and allocating capacity devices for the entire provisioned capacity that remain partially unused, and/or initially creating spaces with little provisioned capacities and repeatedly expanding the spaces and allocating extents to provide additional capacity, the administrator may simply overprovision the spaces, may monitor the available capacity of the storage device set, and add storage devices to avoid capacity exhaustion.

FIG. 1 presents an illustration of an exemplary scenario 100 featuring a storage device set 102 of storage devices 104, each having an available capacity identified as a set of physical addresses. In this exemplary scenario 100, the capacity of the storage devices 104 may be allocated at a set of extents 106, illustrated here as consuming a fixed address block of 0x0100 words. Respective extents 106 are allocated for a space 108, which may represent, e.g., a logical volume, a checksum area, a storage journal, or a maintenance area for storing metadata for the storage device 104. A request may be received to create a space 108 of a particular provisioned capacity 110, and the storage device set 102 may store information representing the space 108 (e.g., in a configuration area). The storage device set 102 may vary in the manner of allocating capacity upon receiving the request. For example, the storage device set 102 may promptly allocate extents 106 to fulfill the entire provisioned capacity of a space 108 (e.g., extents 106 have been fully allocated for the provisioned capacity 110 of spaces 1, 2, and 5 in this exemplary scenario). Alternatively, the storage device set 102 may allocate fewer than all of the extents 106, but may wait to allocate remaining extents 106 until a write request is received when the extents 106 allocated for the space 108 are fully utilized, and may then allocate one or more extents 106 for the space 108 to satisfy the write request. For example, for spaces 3 and 4, the provisioned capacity 110 of the space 108 exceeds the number of extents 106 allocated for the space 108, but the storage device set 102 may subsequently allocate additional extents 106 on a just-in-time basis. Moreover, in some scenarios, one or more spaces 108 may be overprovisioned, such that provisioned capacity 110 of the spaces 108 exceeds the number extents 106 physically available on the storage devices 104. This excess provision may only present a problem when the available capacity of the storage device set 102 is exhausted, such that an overprovisioned space 108 having more provisioned capacity 110 than allocated capacity requests an additional extent 106, but the storage devices 104 have no capacity remaining to allocate additional extents 106. However, an administrator of the storage device set 102 may avoid this predicament by monitoring the available capacity of the storage device set 102, and, when the available capacity nears exhaustion, expanding the available capacity of the storage device set 102 by adding storage devices 104. In this manner, overprovisioning of the spaces 108 for respective logical volumes may enable an administrator of the storage device set 102 to create spaces 108 with a maximum logical capacity that is not restrained by the current physical capacity of the storage device set 102, and to supplement the available capacity of the storage device set 102 to satisfy the utilization of the storage device set 102.

Thus, in these and other scenarios, a storage device set 102 may be configured to allocate capacity in response to various requests (e.g., organize the physical capacity of the storage devices 104 in order to provide logical capacity for spaces 108 or other manifestations of logical volumes). Thus, in many scenarios, the physical locations of the allocated capacity may be insignificant; e.g., on the storage devices 104 of a RAID 4 array, the physical location of a data set may be arbitrarily allocated anywhere on any storage device 104. However, in some such scenarios, the manner of selecting physical locations to satisfy requests to allocate capacity may have practical consequences. As a first example, in some RAID schemes, respective data sets are distributed across the storage devices 104, and each capacity request is satisfied by allocating a portion of the requested capacity on each storage device 104. As a second example, in scenarios involving highly dynamic data (e.g., data sets that are frequently created, deleted, and/or resized), the compaction of the data set may degrade as the storage device set 102 nears exhaustion; e.g., available capacity may be physically fragmented into small portions throughout the storage device set 102. Thus, even if the total available capacity of the storage device set 102 is sufficient for a capacity request specifying a large block of data, the storage device set 102 may be unable to locate a contiguous block of free capacity to satisfy the request, and may have to allocate the capacity in a fragmented manner and/or rearrange other data in order to compact the used capacity and aggregate the available capacity in order to fulfill the capacity allocation request.

As further illustrated in the exemplary scenario 100 of FIG. 1, some spaces 108 may specify a constraint 112 that affects the placement of extents 106 to fulfill a request to allocate capacity of the space 108. For example, a constraint 112 for the first space 108 may specify that the space 108 is configured according to a RAID 1 scheme, wherein a data set is automatically mirrored on two or more storage devices 104, and that the extents 106 allocated therefor are to span two storage devices 104. Accordingly, a pool 114 of extents 1008 may be allocated across the first storage device 104 and the second storage device 104 (and may advantageously be selected at the same physical locations each storage device 104), thereby enabling a parallel access to the extents 106 of the space 108. As a second example, the second space 108 may include a constraint 112 specifying the allocation of a contiguous block of extents 106, e.g., for a data set that is primarily accessed in a streaming manner. As a third example, the fifth space 108 may be formatted according to a RAID 4 scheme, and may therefore include a constraint 112 that extents 106 allocated for the capacity of this space 108 are to be distributed across four storage devices 104 (e.g., comprising three areas for user data and a checksum area), and the storage device set 102 may allocate a pool 114 of extents 106 spanning all four storage device 104. In this manner, the storage device set 102 may provide options for allocating particular types of capacity and features for respective spaces 108, and may allocate extents 106 on the storage devices 104 in a manner that satisfies the constraints 112 of the spaces 108.

In view of these considerations, it may be appreciated that while many scenarios may satisfactorily utilize any strategy for allocating capacity in response to a request, some allocation strategies may more efficiently allocate storage than other allocation strategies. As a first exemplary allocation strategy, requested capacity may be allocated on the storage device 104 having the largest amount of available capacity. This example may distribute successive storage requests over the storage devices 104 in view of the changing available capacity thereof, thus reducing the exhaustion of capacity on one storage device 104 while other storage devices 104 contain plentiful capacity. However, this allocation strategy fulfills each capacity request by allocating capacity on one storage device 104, and may therefore be incompatible with pooled storage or some features of RAID arrays. As a second exemplary allocation strategy, each storage request may be fulfilled by equally allocating the requested capacity across all available storage devices 104. If this technique is used to fulfill all capacity requests for a set of storage devices 104 having the same capacity, this strategy may consume the capacity of all storage devices 104 in an approximately uniform manner. However, this allocation strategy may be incompatible with storage device sets 102 having storage devices 104 of varying available capacity, such as storage device sets 102 featuring storage devices 104 with different physical capacities, or where some allocation requests are satisfied using different allocation strategies (e.g., allocating a block of capacity from one storage device); in these scenarios, an even distribution of capacity allocations across all storage devices 104 exhausts those having less available capacity before those having greater available capacity.

Further complications may be caused by capacity requests specifying one or more constraints regarding the selected storage devices 104. For example, a first capacity request may specify that the capacity is to be distributed and/or mirrored across a particular number of storage devices 104 in order to improve throughput or reliability; a second capacity request may specify that the capacity is to be allocated as a contiguous block of one storage device 104 (e.g., in order to promote efficiently streaming of the data set of the capacity from one storage device 104, particularly utilizing read-ahead and burst features of the storage device 104); and a third capacity request may specify no constraint, and may therefore be allocated from the available capacity of any storage device 104. Thus, allocation strategies may be designed to select capacity in a manner that results in available capacity with greater variety, in order to provide the capability to fulfill subsequent capacity requests with variable constraints. For example, the allocation strategies may be designed to compact allocated capacity and aggregate available capacity (e.g., using a best-fit selection of allocations), and/or to distribute available capacity across all storage devices 104, such that capacity is available on all storage devices 104 in order to satisfy subsequent requests specifying a constraint of multiple storage devices 104.

In view of these considerations, it may be appreciated that the design of an allocation strategy for selecting a particular storage device 104 and physical location to satisfy a capacity request may significantly affect the performance of the storage device set 102. Conversely, it may be appreciated that a poorly designed allocation strategy may select allocations in a manner that limits the constraints 112 that may be satisfied by the remaining available capacity of the storage devices 104 in response to subsequent capacity requests. That is, even if the available capacity of the storage device set 102 is sufficient to satisfy the size of a capacity request, it may be difficult to allocate capacity that satisfies the constraint 112 of the request. The storage device set 102 may therefore have to relocate some data in order to arrange the available capacity to satisfy the constraint 112 of the request, which may delay the fulfillment of the request (possibly blocking the requesting process or thread for an extended period of time). Indeed, in some scenarios, it may not be possible to fulfill the request despite a sufficient available amount of physical capacity, because other processes may be actively utilizing the other data sets of the storage device set 102, and/or it may not be possible to relocate other data sets without (temporarily or even permanently) violating the constraints 112 associated therewith. Thus, the problems resulting from a poorly designed allocation strategy may have a significant impact on the storage device set 102.

Figure 2:
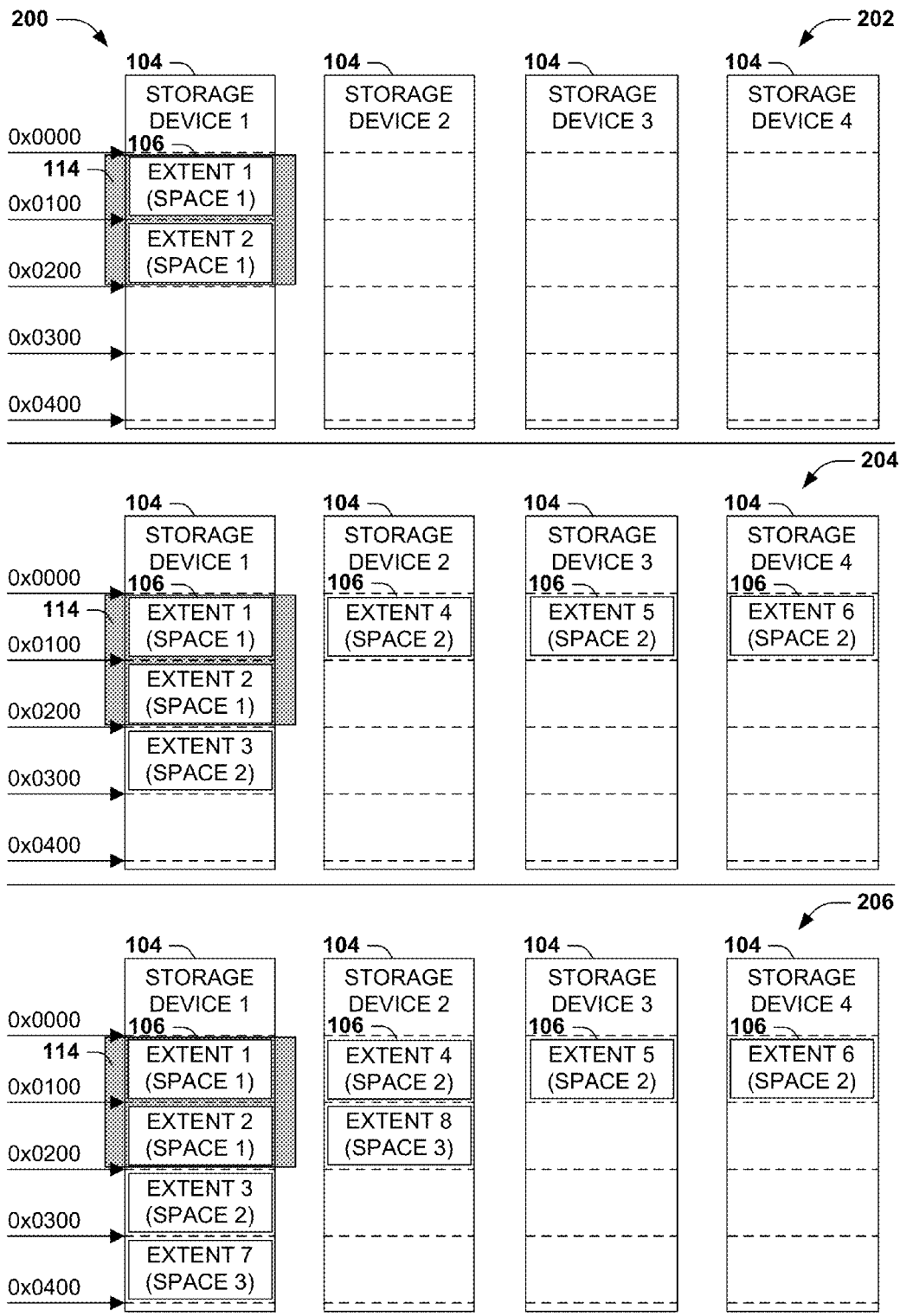
FIG. 2 is an illustration of an exemplary scenario featuring an inefficient allocation of capacity on storage devices of a storage device set.

FIG. 2 presents an illustration of an exemplary scenario 200 depicting a result of an inefficient allocation strategy. In this exemplary scenario 200, a storage device set 102 of four storage devices 104, initially empty, may be provided. At a first time point 202, in response to a first capacity request for a first space 108, two extents 106 may be allocated. Moreover, the extents 106 may be allocated together on the same storage device 104, e.g., in accordance with a constraint 112 specified by the request and/or the space 108 indicating the allocation of contiguous extents 106. At a second time point 204, a second request may request the allocation of four extents 106 for a second space 108, and the storage device set 102 may distribute the allocation by allocation one extent 106 on each storage device 104. This distribution may be indicated by a constraint 112 specified for the second space 108, or according the allocation strategy of the storage device 104 (e.g., a strict round-robin allocation strategy that seek to maximize the distribution of each data set across several storage devices 104). While the increased performance and/or reliability enabled by this distribution may be advantageous, the distribution may also limit the use of the available capacity for future requests. For example, at a third time point 206, the storage device set 102 may receive a request to allocate two extents 106 for a third space 108 (and may not specify a constraint 114), but the allocation strategy may fulfill the request by allocating extents 106 on the first and second storage devices 104. This allocation may exhaust the capacity of the third storage device 104, even though only 50% of the physical capacity of the storage device set 102 has been utilized. If a subsequent request for capacity specifies a constraint 114 indicating a distribution across all four storage devices 104, the storage device set 102 is unable to satisfy this request without relocating one or more extents 106 from the first storage device 104 to another storage device 104. Additionally, the overloading of the first storage device 104 increases the probability of receiving competing requests to access the first storage device 104, resulting in delayed responses and performance of the first storage device 104, while the other storage devices 104 remain idle. As yet another example, the increased usage of the first storage device 104 may shorten the lifespan of the first storage device 104 while the other storage device 104 remain idle. These and other problems may therefore arise from the design of an inefficient allocation strategy.

Another problem that may arise within storage device sets 102 involves the exhaustion of available capacity in a storage device set 102 comprising spaces 108 that have been overprovisioned. In particular, a variety of spaces 108, each having a particular usage, may be overprovisioned, and monitored by an administrator to avoid capacity exhaustion. However, in many such scenarios, capacity remains available for all overprovisioned spaces 108 until capacity exhaustion is reached, at which point capacity becomes unavailable for all overprovisioned spaces 108. This result may be undesirable, e.g., if spaces 108 have different priorities, then an overprovisioned, higher-priority space 108 may be denied capacity after an overprovisioned, lower-priority space 108 consumes all remaining available capacity. However, it may be undesirable to reallocate capacity from the lower-priority space 108 to the higher-priority space 108 if such capacity is in use, thereby resulting in data loss.

Figure 3:
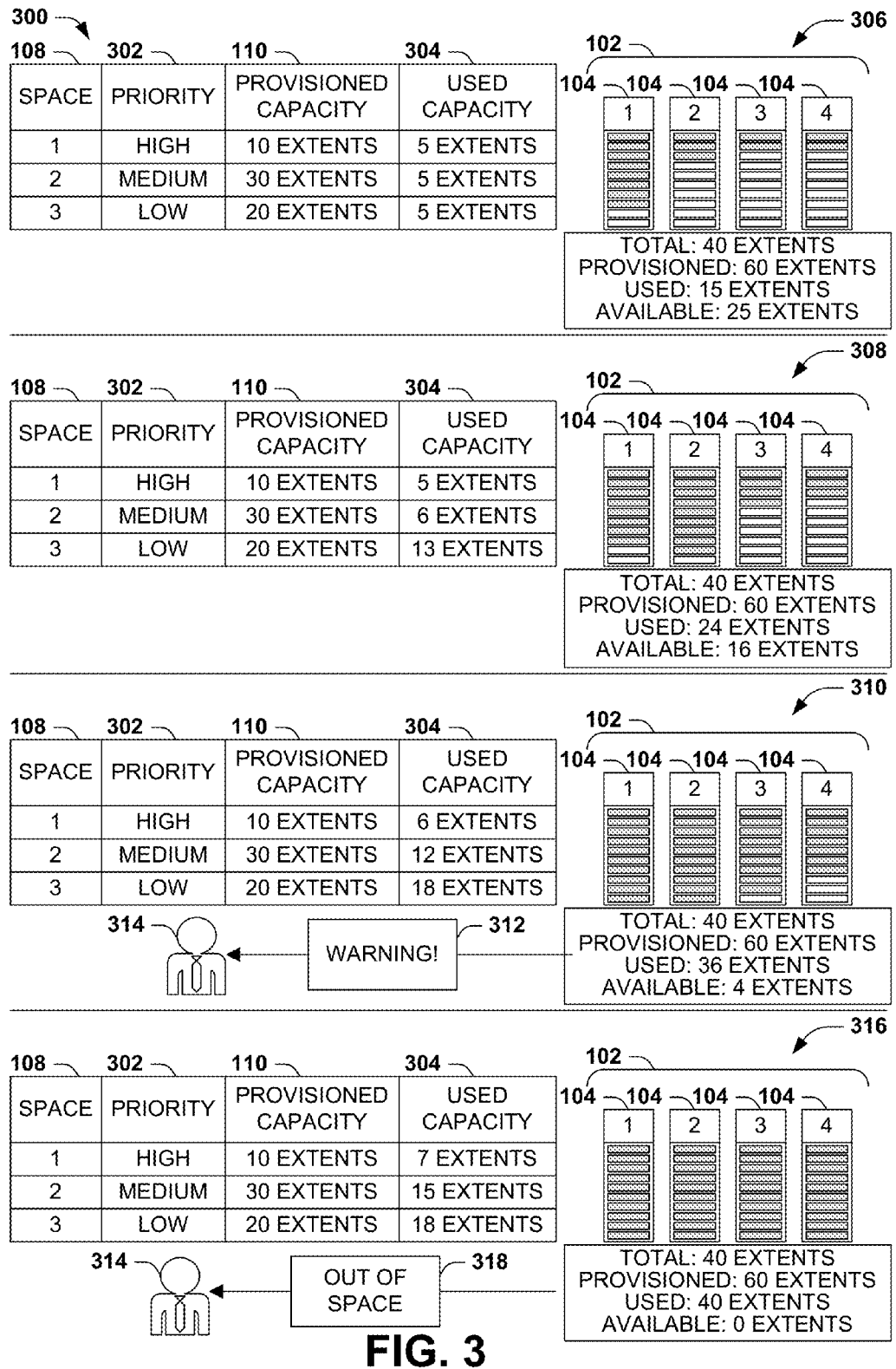
FIG. 3 is an illustration of an exemplary scenario featuring an exhaustion of capacity on the storage devices of the storage device set.

FIG. 3 presents an exemplary scenario 300 featuring the consequences of an exhaustion of available capacity. In this exemplary scenario 300, a storage device set 102 comprising a set of storage devices 104 is configured to allocate extents 106 for respective spaces 108, each having a provisioned capacity 110 and a used capacity 304 (i.e., the total capacity of the extents 106 that have been allocated for the spaces 108). The respective spaces 108 may have a priority 302, such as a high-priority space comprising valuable user data; a medium-priority space comprising a logical volume manifesting an operating environment for a computer system; and a low-priority space allocated as a cache or a scratch disk for working data. In this exemplary scenario 300, the storage device set 102 has been thinly provisioned, such that spaces 108 have been provisioned with a total logical capacity of 60 extents 106, but are stored by a storage device set 102 having a total physical capacity of 40 extents. For example, the capacity utilized by the low-priority space 108 may fluctuate (e.g., the cache and working space may expand or contract with usage), and overprovisioning this space 108 may enable the use of available capacity for such temporary uses, thereby avoiding an artificial limit of the capacity of the low-priority space 108 when capacity is available on the storage devices 104. Additionally, the storage device set 102 may enable the delayed allocation of extents 106 for spaces 108, such that the high- and medium-priority spaces 108 may not have extents 106 allocated for the full provisioned capacity 110 of the space 108, but may be allocated later as the spaces 108 are filled with data.

As further illustrated in the exemplary scenario 300 of FIG. 3, the available capacity of the storage device set 102 may be consumed over time and eventually exhausted. For example, at a first time point 306, the storage device set 10 may be only partially utilized with only five extents 106 allocated per space 108, thereby presenting ample available capacity for additional requests. At a second time point 306, the capacity may be more heavily utilized, and in particular, the low-priority space 108 may rapidly consume the available capacity of the storage device set 102 (while restricting utilization within the provisioned capacity 110). At a third time point 310, the capacity of the storage device set 102 may be dwindling, and the storage device set 102 may generate an alert 312 for an administrator 314 of the storage device set 102 to indicate the imminent exhaustion of available capacity. However, the administrator 314 may not provide storage devices 104 or otherwise address the imminent exhaustion, and at a fourth time point 316, the available capacity of the storage device set 102 may be exhausted. However, as a result of this configuration, this condition applies equally to all spaces 108; e.g., additional capacity becomes unavailable for all spaces 108, regardless of priority 302. The administrator 314 may not have perceived this result, particularly for the high-priority space 108, which was created with a provisioned capacity 110 at a time when the storage device set 102 had ample available capacity. Indeed, the administrator 314 may not even have perceived the first space 108 as overprovisioned; e.g., the space 108 was created with a comparatively small provisioned capacity 110 at a time point when the storage device set 102 had ample available capacity. Rather, the exhaustion of the available capacity of the first space 108 arises from configuration of the storage device set 102 to delay the allocation of extents 106 for any space 108, and as a result, the consumption of available capacity by the low-priority third space 108 results in the unavailability of extents 106 and the exhaustion of capacity for the first and second spaces 108. Avoiding this result may involve reducing or altogether avoiding the use of overprovisioning of the storage device set 102 (e.g., reducing the provisioned capacity 110 of the low-priority space 108), selectively or generally or disabling delayed capacity allocation (thereby resulting in reduced performance, such as protracted response time, for the allocation or adjustment of spaces 108, and/or the allocation of extents 106 for a space 108 in the absence of an imminent use of the capacity of the space 108). However, these features are generally advantageous, and the inability to utilize such features may diminish the capabilities of the storage device set 102.

B. Presented Techniques

Presented herein are allocation strategies for storage device sets 102 that may reduce or avoid some of the problems of less efficient allocation strategies, including those depicted in the exemplary scenarios of FIGS. 2-3. In accordance with these techniques, capacity may be allocated on respective storage devices 104 of a storage device set 102 in view of particular properties of the storage devices 104. For example, when selecting a location within the storage device set 102 to allocate capacity in order to fulfill a capacity request for a space 108, an embodiment of these techniques may examine the storage devices 104 to identify those that have spacious capacity, and may select these storage devices 104 as a spacious storage device subset of the storage device set 102. In particular, an embodiment may define an available capacity minimum threshold (e.g., a minimum number of extents 106 that remain available for allocation), and may select storage devices 104 for this subset having at least this minimum number of available extents 106. Capacity for the space 108 may first be allocated on the storage devices 104 of the spacious storage device subset in various ways (e.g., a round-robin allocation strategy that maximizes the distribution of the allocated capacity across the storage devices; a capacity utilization allocation strategy that allocates capacity on the storage devices of the spacious storage device subset having the greatest available capacity; or an access rate strategy that allocates capacity on the storage devices 104 according to the frequency of accesses to the extents 106 allocated for each such storage device 104). However, in some cases, this allocation may be inadequate to satisfy the capacity request; e.g., the capacity request may specify a minimum distribution, such as a minimum number, type, or location of storage devices 104 across which the capacity is to be allocated, and the minimum distribution may exceed the number of storage devices 104 comprising the spacious storage device subset. Therefore, an embodiment of these techniques may next identify a limited storage device subset, comprising the storage devices 104 of the storage device set 102 for which available capacity is limited (e.g., available capacity has not been exhausted, but is below the available capacity minimum threshold). The embodiment may therefore fulfill the remainder of the capacity request by allocating extents 106 for the space 108 on the storage devices 104 of the limited storage device subset (again, utilizing any or several allocation strategies such as round-robin, capacity utilization, and access rate). In this manner, an embodiment of these techniques may fulfill the capacity request for the space 108 from the storage devices 104 of the storage device set 102 using a comparatively simple evaluation while also preserving the capacity of limited storage devices 104, and also using various allocation strategies that may advantageously distribute the allocated capacity within the selected subsets.

Figure 4:
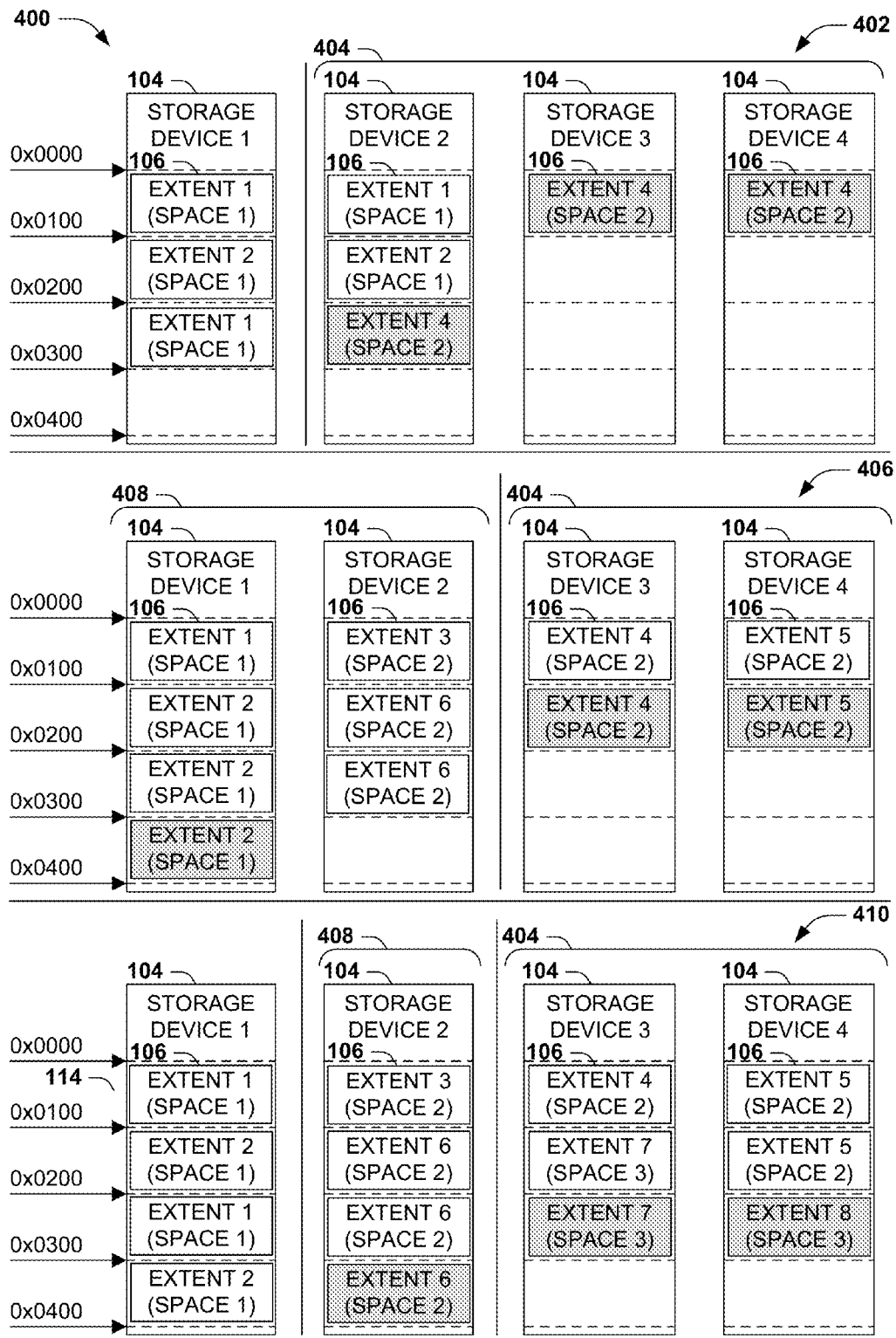
FIG. 4 is an illustration of an exemplary scenario featuring an efficient allocation of capacity on storage devices of a storage device set in accordance with the techniques presented herein.

FIG. 4 presents an illustration of an exemplary scenario 400 featuring an allocation of capacity within a storage device set 102 according to the techniques presented herein. In this exemplary scenario 400, a set of storage devices 104 allocates capacity for respective spaces 108, e.g., by mapping an extent 106 located at a physical address range on a storage device 104 to a logical address range of the space 108. At a first time point 402, a first capacity request may be received to allocate three extents 108 for a fourth space 108. However, the storage devices 104 may already have allocated extents 106 for other spaces 104, and may therefore present unequal amounts of available capacity. Therefore, the storage device set 102 may fulfill the capacity request through the use of the allocation strategies presented herein. In particular, the storage device set 102 may first identify a spacious storage device subset 404, comprising the storage devices 104 of the storage device set 102 having at least a number of available extents 106 specified by an available capacity minimum threshold (defined in this exemplary scenario 400 as at least two available extents 106). Thus, the storage device set 102 may define a spacious storage device subset, comprising the storage devices 104 satisfying the available capacity minimum threshold (e.g., the second, third, and fourth storage devices 104), and may allocate extents 106 on the storage devices 104 of this subset using any suitable allocation technique (e.g., a round-robin allocation technique that maximally allocates extents 106 across all of the storage devices 104 of the subset), thereby satisfying the first capacity request.

As further illustrated in the exemplary scenario 400 of FIG. 4, at a second time point 406, a second capacity request may be received that requests an allocation of extents 108 on three storage devices 104. The storage device set 102 may again identify a spacious storage device subset (now comprising only the third and fourth storage devices 104), and may allocate an extent 106 on each storage device 104. However, this allocation does not fully satisfy the capacity request, so the embodiment may next select a limited storage device subset 408, comprising the storage devices 104 having less than the available capacity minimum threshold but having more than zero available extents 106 (i.e., the first and second storage devices 104). The storage device set 102 may therefore allocate the third extent 106 on one of the storage devices 104 of this subset (using any suitable allocation strategy), and may therefore exhaust the capacity of the first storage device 104 but fulfilling the second capacity request. At a third time point 406, a third capacity request may be received that against requests an allocation of extents 108 on three storage devices 104. The storage device set 102 may again identify a spacious storage device subset (again comprising only the third and fourth storage devices 104), and may allocate an extent 106 on each storage device 104. In order to allocate the third extent 104 on a different storage device 104 in compliance with the constraint of the capacity request, the embodiment may next select a limited storage device subset 408, comprising the storage devices 104 having less than the available capacity minimum threshold but having more than zero available extents 106 (now comprising only the second storage device 104) and allocate the third extent 106 on the second storage device 104. In this manner, the storage device set 102 may efficiently fulfill capacity requests according to the techniques presented herein.

Additional techniques presented herein relate to the scenario depicted in the exemplary scenario 300 of FIG. 3, involving the effects of an exhaustion of available capacity on spaces 108 that have not been fully allocated (including those that an administrator 314 has overprovisioned, but also including those for which allocation has simply been delayed). In these scenarios, it may be advantageous to provide a mechanism for reserving capacity for a space 108 in the event of exhaustion of the available capacity of the storage device set 102. That is, without allocating capacity for a space 108 that is not in use, the storage device set 102 may nevertheless hold some capacity in reserve for the space 108 in case available capacity is exhausted. Moreover, such capacity may be reserved on several storage devices 104 of the storage device set 102, e.g., in compliance with a constraint associated with the space 108. Therefore, an additional feature that may be included in embodiments of the techniques presented herein is the reservation of a capacity reservation for one or more spaces 108, wherein the capacity reservation may be achieved by reserving a capacity reservation portion on respective storage devices 104 of the storage device set 102. The respective storage devices 104 may therefore report an available capacity as the unallocated capacity minus the capacity reservation portions reserved on the storage device 104 for respective spaces 10. As a space 108 requests capacity, the capacity reservation may be reduced, thereby resulting in a reduction of the capacity reservation for the space 108, but not the available capacity of the storage device 104. Alternatively, the capacity reservation for the space 108 may be maintained up to a maximum of the remaining provisioned capacity of the space 104 (e.g., it may not be advantageous to hold capacity in reserve that exceeds the provisioned capacity 110 of the space 108). This variation results in a reduction of the available capacity of the storage device 104, but not of the capacity reservation for the space 108. These techniques may enable the delayed allocation of capacity for a space 108 without risking the exhaustion of capacity for the space 108, thereby enabling devices to continue using (and expanding) the space 108 in the event of an exhaustion of available capacity of the storage device set 102.

Figure 5:
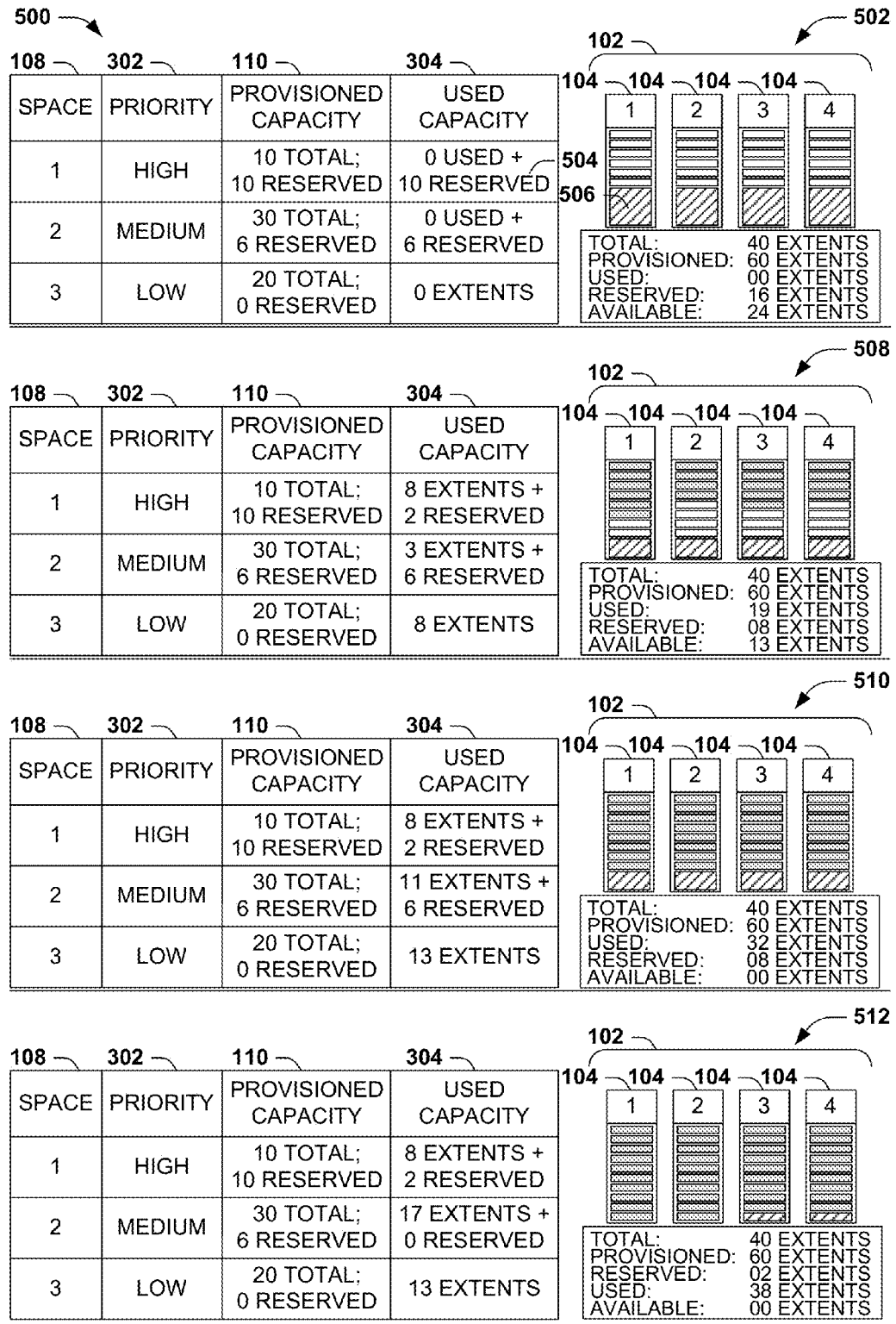
FIG. 5 is an illustration of an exemplary scenario featuring an exhaustion of capacity on the storage devices of the storage device set with capacity reservations for some overprovisioned spaces in accordance with the techniques presented herein.

FIG. 5 presents an illustration of an exemplary scenario 500 featuring the use of capacity reservations to avoid some of the problems associated with delayed capacity allocation. In this exemplary scenario 500, a set of storage devices 104 provide capacity (in the form of extents 106) for respective spaces 108 having a priority 302 and a provisioned capacity 110. However, in contrast with the exemplary scenario 300 of FIG. 3, in this exemplary scenario 500, two of the spaces 108 also comprise a capacity reservation 504 in the form of a specified number of extents 106. In particular, the first space 108, having a high priority 302, comprises a sufficient capacity reservation 504 for the entire provisioned capacity 110 of 10 extents 106 for the first space 108; while the second space 108, having a medium priority 302, comprises a capacity reservation 504 of 6 extents 106, which is sufficient for storing only a portion of the total provisioned capacity 110 of 30 extents. These capacity reservations 504 are not yet allocated for or bound to the spaces 108 (since spaces 108 are not initially empty and such extents 106, if bound to a space 108, may initially remain unused), and the capacity reservation 504 may not correspond to particular extents 106 or physical address ranges on each storage device 104, but may simply comprise a portion of the physical capacity of the storage device 104 that is held in reserve. Therefore, at a first time point 502, the storage device set 102 comprises 40 extents 106 and is completely empty; nevertheless, the storage device set 102 reports that only 24 extents 106 are available, because sufficient capacity for 16 extents 106 is held in reserve as capacity reservations 504 for the first tow spaces 108 (illustrated on each storage device 104 as a striped region indicating the capacity reservation portion 506 held in reserve on the storage device 104).

As further illustrated in the exemplary scenario 500 of FIG. 5, at a second time point 508, some extents 106 have been allocated on the storage devices 104 for each of the spaces 108. For example, for the third space 108, 8 extents 106 have been allocated, and for the second space 108, 3 extents have been allocated, while 6 extents are still held in reserve by the storage device set 102 for the second space 108. Accordingly, the available capacity of the storage device set 102 has been reduced by 11 extents 106. However, for the first space 108, eight extents 106 have been allocated; however, because rather than reducing the available capacity, the storage device set 102 reduces the capacity reservation 504 for the space 108 so that the capacity reservation 504 does not exceed the remaining provisioned capacity 110 of the first space 108. At a third time point 510, the continued expansion of the allocated capacity of the second space 108 and the third space 108 results in the exhaustion of the available capacity of the storage device set 102. However, some capacity remains available for the first space 108 (sufficient to satisfy the remainder of its provisioned capacity 110) and for the second space 108 (e.g., 6 extents 108, which may be sufficient to satisfy the volume of data stored in the second space 108 until additional capacity may be added). Accordingly, at a fourth time point 512, the first and second spaces 108 have been able to request and receive additional allocated capacity by consuming the capacity reservations 504 of each space 108. In this manner, and in contrast with the exemplary scenario 300 of FIG. 3, capacity reservations 504 may enable some spaces 108 to continue to request and receive allocations of capacity even after the exhaustion of the available capacity of the storage device set 102.

It may be particularly advantageous to implement both the allocation strategies and the capability of capacity reservations in an embodiment of these techniques. For example, the determinations of whether a particular storage device 104 has ample available capacity (and therefore may be included in the spacious storage device subset 404), and whether a particular storage device 104 has limited but nonzero available capacity (and therefore may be included in the limited storage device subset 408), may include the consideration of the capacity reservation portions 506 for each storage device 104. That is, the number of extents 106 available for allocation may exclude the capacity reserved as capacity reservations 504 for the spaces 108, even if such capacity reservations are not yet allocated for any space 108. Indeed, among the unallocated areas of a storage device 104, the characterization of areas as available extents 106 or as capacity reservations may be indeterminate; i.e., the reserved capacity is determined by the unallocated areas remaining after all available capacity has been allocated. This combination of these techniques may further facilitate the allocation of capacity of a storage device set 102 for respective spaces 108 in accordance with the techniques presented herein.

C. Exemplary Embodiments

Figure 6:
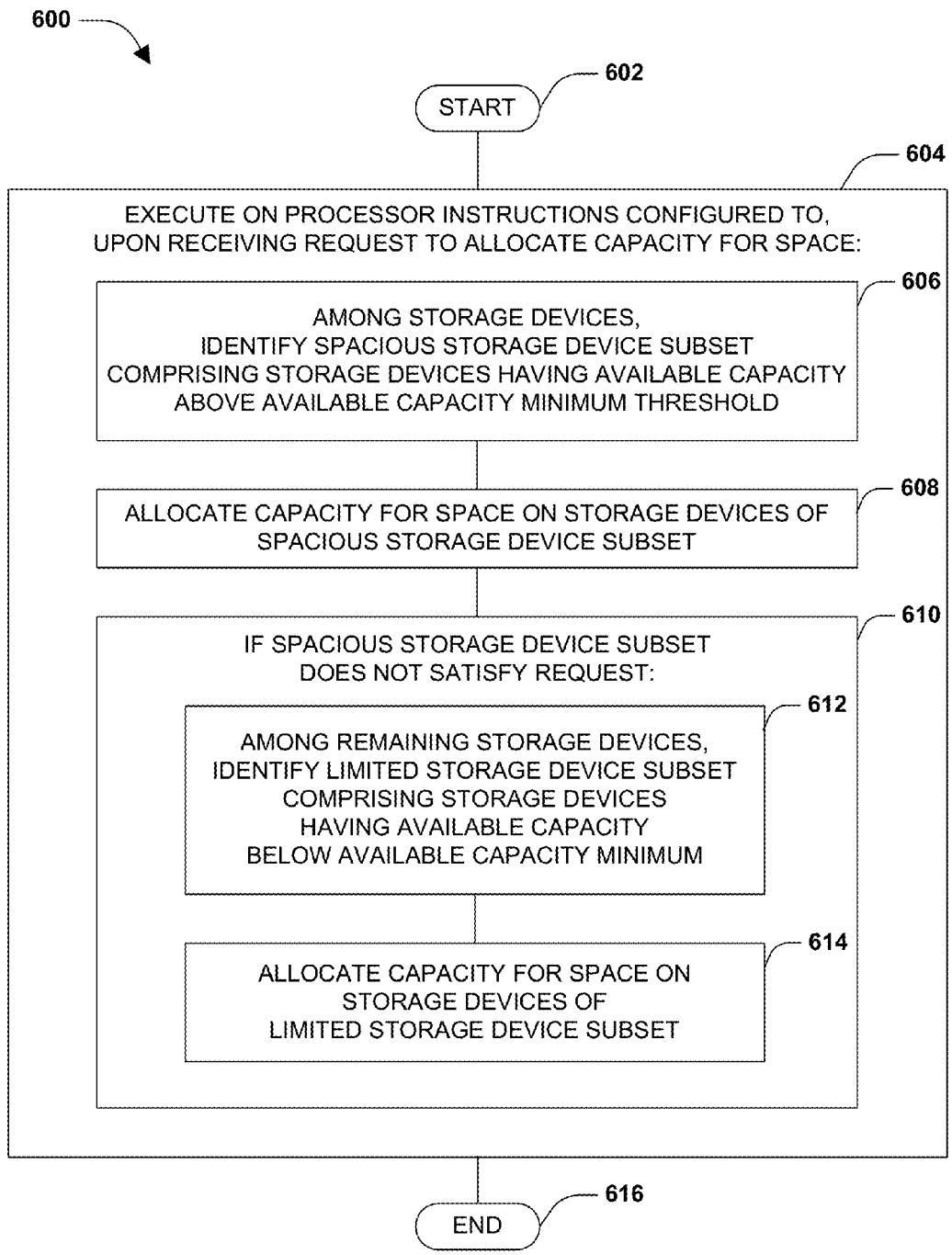
FIG. 6 is a flowchart illustrating a first exemplary method of allocating capacity for spaces on a storage device set in accordance with the techniques presented herein.

FIG. 6 presents an illustration of a first embodiment of these techniques, illustrated as an exemplary method 600 of allocating capacity for spaces 108 on a storage device set 102 comprising at least two storage devices 104. The exemplary method 600 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 600 begins at 602 and involves executing 604 the instructions on the processor. Specifically, the instructions are configured to, upon receiving a request to allocate capacity for a space 108, among the storage devices 104, identify 606 a spacious storage device subset 404 comprising storage devices 104 having available capacity above an available capacity minimum threshold; and to allocate 608 capacity for the space 108 on the storage devices 104 of the spacious storage device subset 404. The instructions are also configured to, if 610 the spacious storage device subset 404 does not satisfy the request, identify 612, among remaining storage devices 104, a limited storage device subset 408 comprising storage devices 104 having available capacity below the available capacity minimum threshold (i.e., those having nonzero available capacity, but having less available capacity than defined by the available capacity minimum threshold), and to allocate 614 capacity for the space 108 across the storage devices 104 of the limited storage device subset 408. In this manner, the exemplary method 600 achieves the allocation of capacity on the storage device set 102 for respective spaces 108 according to the techniques presented herein, and so ends at 616.

Figure 7:
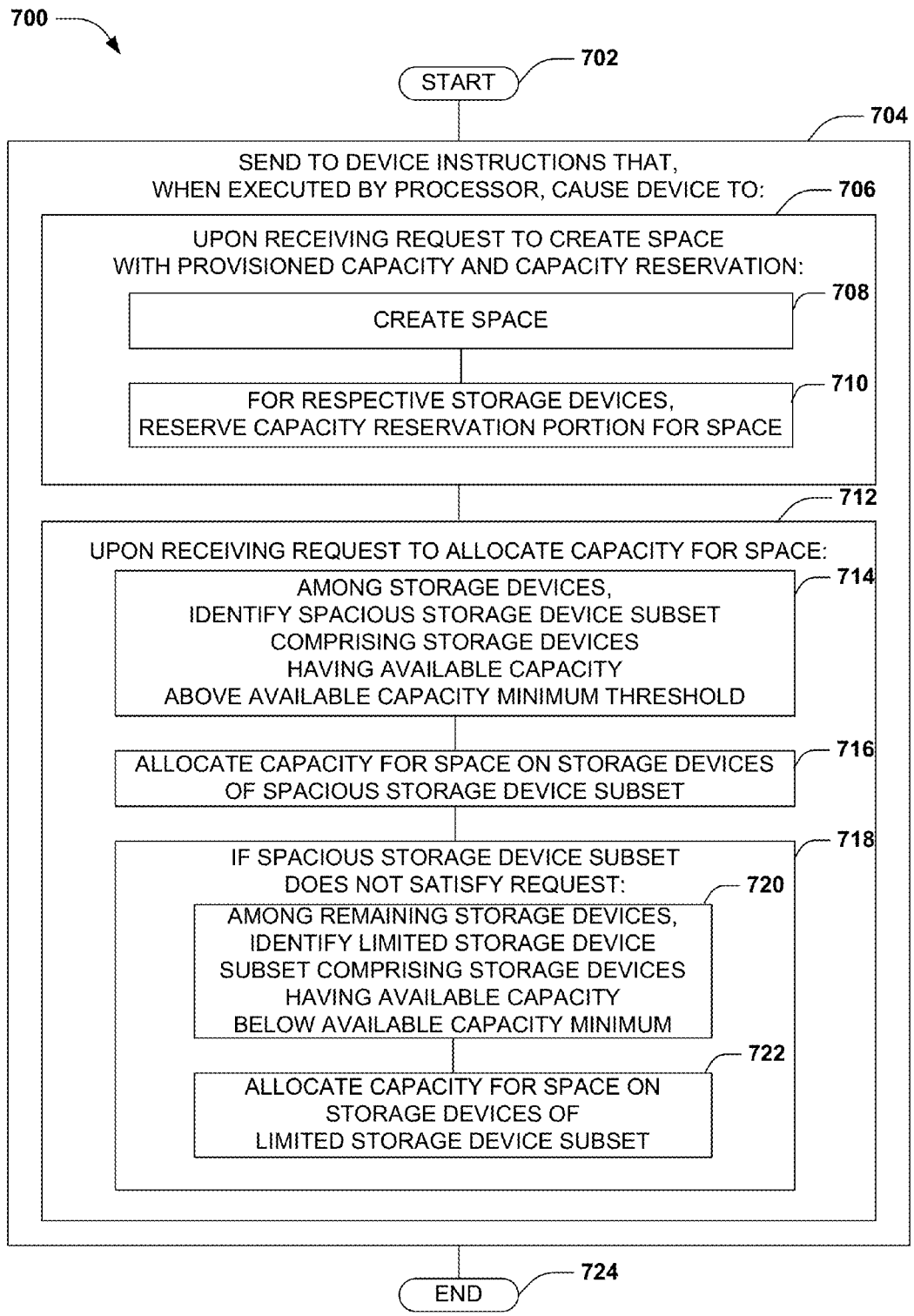
FIG. 7 is a flowchart illustrating a second exemplary method of allocating capacity for spaces on a storage device set in accordance with the techniques presented herein.

FIG. 7 presents an illustration of a second embodiment of these techniques, illustrated as an exemplary method 700 of allocating capacity for spaces 108 on a storage device set 102 comprising at least two storage devices 104. The exemplary method 700 may be implemented, e.g., as a set of instructions stored in a memory component of a device (e.g., a memory circuit, a platter of a hard disk drive, a solid-state memory component, or a magnetic or optical disc) that, when sent to a device having a processor, cause the device to perform the techniques presented herein. The exemplary method 700 begins at 702 and involves sending 704 the instructions to the device. Specifically, the instructions are configured to, upon receiving 706 a request to create a space 108 with a provisioned capacity 110 and a capacity reservation 504, create 708 the space 108, and for respective storage devices 104, reserve 710 a capacity reservation portion 506 for the space 108. The instructions are also configured to, upon receiving 712 a request to allocate capacity for the space 108, identify 714, among the storage devices 104, a spacious storage device subset 404 comprising storage devices 104 having available capacity above an available capacity minimum threshold; and for respective storage devices 104 of the spacious storage device subset 404, allocate 716 at least one extent 106 for the space 108 on the storage devices 104 of the spacious storage device subset 404. The instructions are also configured to, if 718 the spacious storage device subset 404 does not satisfy the request, identify 720, among remaining storage devices 104, a limited storage device subset 408 comprising storage devices 104 having available capacity below the available capacity minimum threshold, and allocate 722 capacity for the space 108 across the storage devices 104 comprising the limited storage device subset 408. Additionally (though not depicted in the exemplary method 700 of FIG. 7), the instructions may also be configured to, upon allocating capacity on a storage device 104 (whether or spacious or limited available capacity), adjust the capacity reservation portion of the capacity reservation 504 for the space 108. In this manner, the exemplary method 700 may achieve the allocation of the capacity of the storage device set 102 on behalf of the spaces 108 in accordance with the techniques presented herein, and so ends at 724.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 8:
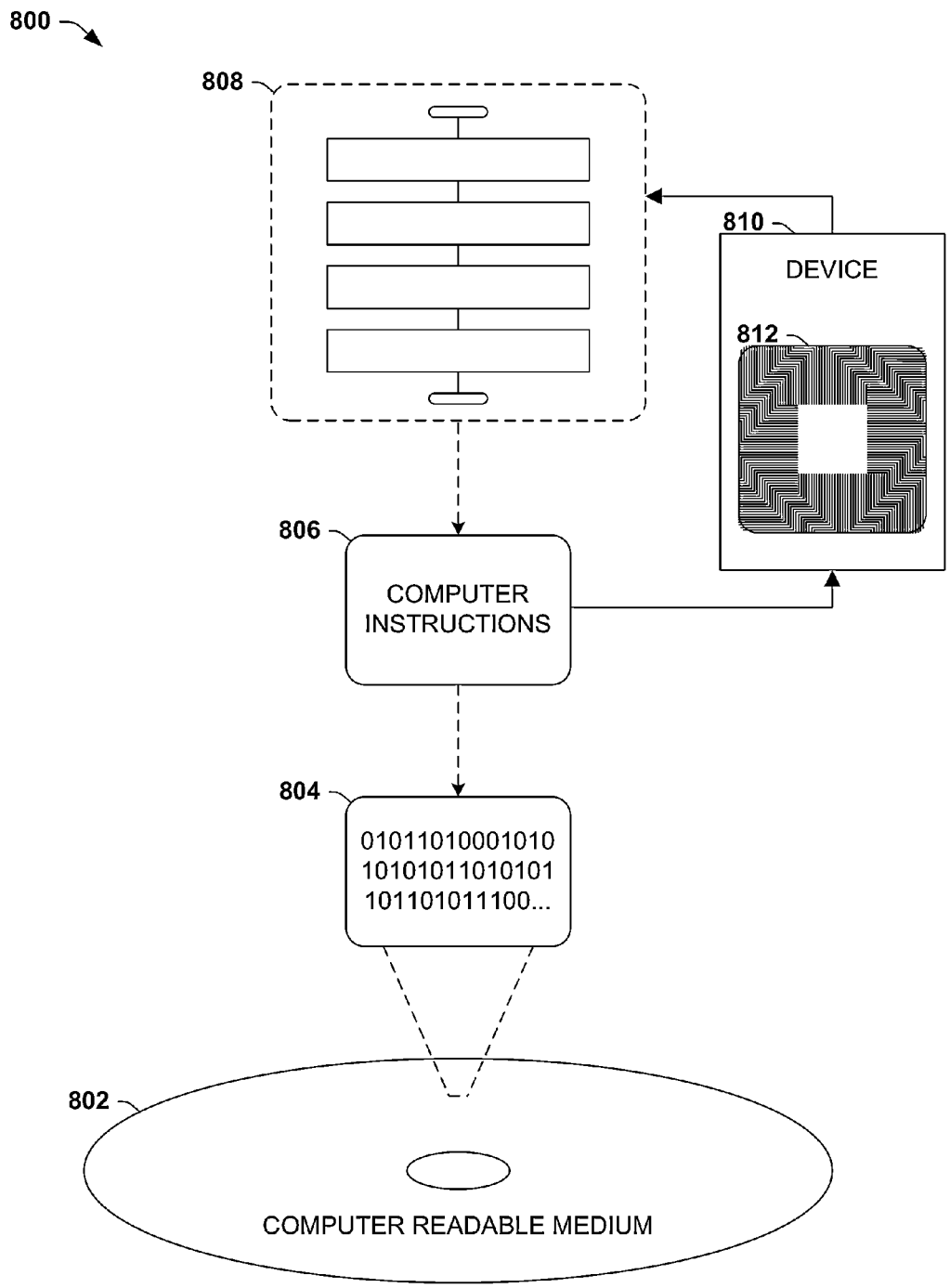
FIG. 8 is an illustration of an exemplary computer-readable medium comprising processor-executable instructions configured to embody one or more of the provisions set forth herein.

An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 that, when executed by a processor 812 of a device 810, cause the device 810 to operate according to the principles set forth herein. In one such embodiment, the processor-executable instructions 806 may be configured to perform a method of allocating capacity of the storage devices 104 of a storage device set 102 in accordance with the techniques presented herein, including the first method 600 of FIG. 6 and the second method 700 of FIG. 7. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary methods 600, 700 of FIGS. 6-7) in order to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used with many types of storage devices 104, including hard disk drives, solid-state storage devices, nonvolatile memory circuits, tape-based storage devices, and magnetic and optical discs. Such storage devices 104 may also be directly connected to a device 810 (such as a computer) implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet). As a second variation of this first aspect, the storage device set 102 may loosely aggregate the storage devices 104 (e.g., storage devices 104 that operate independently but that are informed of and may communicate with the other storage devices 104 sharing the storage device set) or may operate the storage devices 104 with tight interoperation (e.g., a Redundant Array of Inexpensive Disks (RAID) controller managing several storage devices 106 as components of a storage system). As a third variation of this first aspect, the storage devices 104 may sore many types of data sets, including binary storage systems storing various types of binary objects; file systems storing files; media libraries storing media objects; object systems storing many types of objects; databases storing records; and email systems storing email messages. As a fourth variation of this first aspect, portions or all of these techniques may be implemented within one or more components within the computing environment, such as a set of software instructions stored in a volatile or nonvolatile of a computer or device having access to the storage devices 104 (e.g., an operating system process or a hardware driver); by a storage system configured to interface with the storage devices 104 (e.g., a RAID controller); or in respective storage devices 104 of the storage device set 102. As a fifth variation of this first aspect, the storage devices 104 may be organized to allocate capacity in various ways. Although the examples presented herein involve storage devices 104 configured to allocate extents 106 for spaces 108, it may be appreciated that the techniques presented herein may be adapted for use with other allocation schemes, such as the allocation of partitions representing logical volumes, and the formation of a pool 114 of two or more partitions to generate a dynamic partition spanning multiple basic partitions on one or more storage devices 104. Those of ordinary skill in the art may devise many scenarios wherein the techniques presented herein may be utilized.

D2. Allocation Strategies

A second aspect that may vary among embodiments of techniques relates to the allocation strategies utilized to select the particular storage devices 104 and locations of the allocation of capacity (such as extents 106) in response to a capacity request. As a first variation of this second aspect, after selecting storage devices 104 of a storage device subset (e.g., a spacious storage device subset 404 or a limited storage device subset 408), an embodiment of these techniques may arbitrarily select among the storage devices 104 of the storage device subset for the allocations of capacity to satisfy the capacity request. Alternatively, an embodiment may be configured to apply an allocation strategy to select where the allocations of extents 106 are to be made on such storage devices 104.

Figure 9:
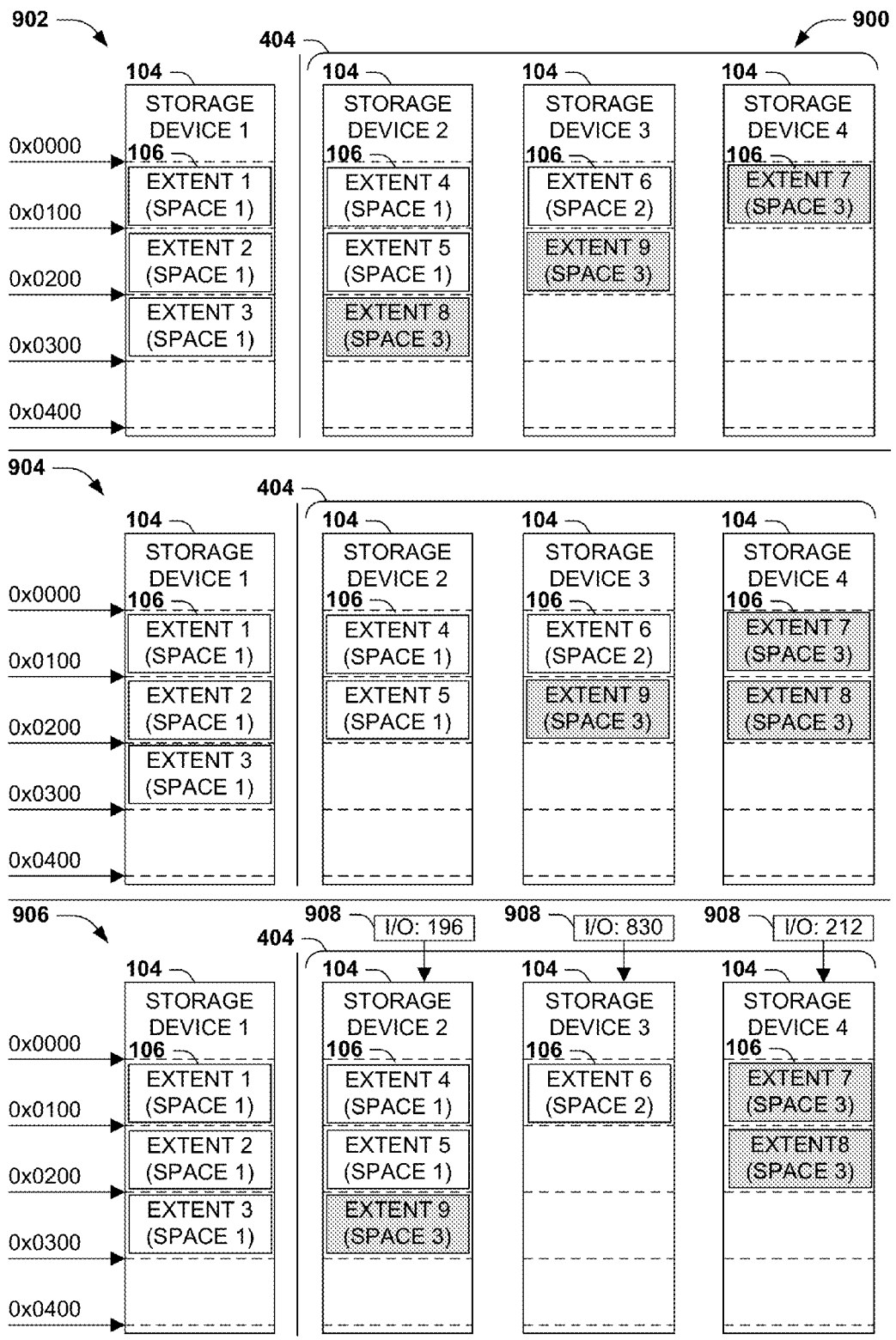
FIG. 9 is an illustration of an exemplary scenario featuring some alternative allocations of capacity on the storage devices of a storage device set that alternatively utilize variations of the allocation strategies presented herein.

FIG. 9 presents an illustration of an exemplary scenario 900 featuring various allocation strategies whereupon this first variation may be based. In this exemplary scenario 900, a storage device set 102 comprising four storage devices 104 is configured to allocate storage as a set of extents 106 for respective spaces 108. A request is received to allocate three extents 106, and no constraint is specified as to where the extents 106 are to be allocated. Therefore, after selecting a spacious storage device subset 404 comprising storage devices 104 having at least an available capacity minimum threshold (defined here as having at least available capacity for two extents 106), the storage device set 102 may utilize any allocation strategy to select the locations of the extents 106. In the exemplary scenario 900 of FIG. 3, three such allocation strategies are illustrated. In a first allocation strategy 902, the extents 106 are allocated according to a round-robin allocation strategy, e.g., where the extents 106 are sequentially distributed across the storage devices 104 of the storage device subset (e.g., identifying a sequence of storage devices 104 of the storage device subset, and allocating each extent 106 on the next storage device 104 of the sequence until the total capacity of extents that have been allocated and associated with the space 108 satisfies the request). Moreover, the round-robin allocation sequence may begin with the storage device 106 following the last storage device 104 upon which an extent 106 was allocated in a previous request; e.g., for a second request following a first request, the round-robin allocation strategy may involve identifying the last storage device 104 on which capacity was allocated for the first request, identifying the next storage device 104 following the last storage device according to a storage device order; and allocating capacity on the storage devices 104 according to the storage device order and beginning with the next storage device 104). In this manner, and as illustrated by the first allocation strategy 902 in FIG. 9, this allocation strategy results in an even distribution of extents 106 over the storage devices 104 of the spacious storage device subset 404.

FIG. 9 also illustrates a second allocation strategy 904, wherein the allocation of capacity is selected based on the capacity utilization of the storage devices 104 of the spacious storage device subset 404. In accordance with this allocation strategy, capacity may be allocated on the storage devices 104 of a storage device subset by identifying a sequence of descendingly ordering the storage devices 104 by available capacity, and allocating capacity on the storage devices 104 according to the sequence. Therefore, the extents 106 are not evenly allocated, but rather are allocated to balance the available capacity on the storage devices 104 of the storage device subset.

FIG. 9 also illustrates a third allocation strategy 906, wherein the allocation of capacity is selected based on the access rates of the storage devices 104. This allocation strategy focuses on the input/output workload of the storage devices 104 and endeavors to allocate capacity in such a manner as to distribute the workload over the storage devices 104, thereby improving the performance of the storage device set 102. To this end, the storage device set 102 may ascendingly order the storage devices 104 based on access rate, and may fulfill the capacity request by allocating extents 106 on the storage devices 104 exhibiting the lowest I/O range. Such metrics may include many types of measurements (e.g., a measure of the queue depth of pending read/write requests; the inbound and/or outbound data rate; a number of open file handles or pending or executed database queries; and/or a number of users, devices, or processes accessing the extents 106 allocated on the storage device 104), and may either be measured on an ad hoc basis or based on historic measurements (e.g., the storage device set 102 may be configured to track the access rates of the storage devices 104 as an access rate history, and to sort the storage devices according to the access rate histories). For example, in the exemplary scenario 900 of FIG. 9, three storage devices 104 are included in the spacious storage device set 404; however, the storage device 104 having the least number of allocated extents 106 and the greatest available capacity exhibits a significantly higher I/O metric 908 than the other storage devices 104 (e.g., possibly due to the nature or popularity of the data comprising the single extent 106 allocated on the third storage device 104). Therefore, the capacity request may be fulfilled by allocating extents 106 on the second and fourth storage devices 104. Even though the available capacity of such storage devices 104 is now more limited, it may be advantageous to allocate the added I/O workload involved in hosting these extents 106 to these storage devices 104 rather than to a storage device 104 that is already hosting an extent 106 comprising a heavily utilized data set. Many such allocation strategies, including a combination thereof, may be utilized in the techniques presented herein.

As a second variation of this second aspect, an embodiment of these techniques may enable a request to specify a storage device distribution constraint for the allocation of capacity. For example, the constraints may be selected from a storage device distribution constraint set comprising a minimum and/or maximum number of different storage devices 104 upon which the allocated capacity is to be distributed; a minimum and/or maximum number of different storage device types (e.g., a homogeneous or heterogeneous mixture of storage devices 104); and a minimum and/or maximum number of different locations of the storage devices 104 (e.g., storage devices 104 located in the same or different racks, buildings, facilities, or geographic areas). Such constraints may be selected in view of various factors of the storage device set 102. For example, it may be desirable to choose homogenous storage devices 104 having similar properties and located in the same general area in order to allocate capacity capable of high throughput for a data set that is likely to be heavily utilized. Conversely, for a data set that is heavily utilized throughout a geographic area, it may be desirable to distribute the data set across a wide geographic area, and therefore to allocate capacity for a mirrored version of the data set on several storage devices 104 located in different geographic regions (such that any consuming device or process may access the mirrored version of the data set on the geographically closest storage device 104). An embodiment of these techniques may therefore accept the specification of storage device distribution constraints with capacity requests, and to utilize such constraints while selecting storage devices 104 in fulfillment of the capacity request. Those of ordinary skill in the art may devise many such allocation strategies in accordance with the techniques presented herein.

D3. Delayed Allocation and Capacity Reserves

A third aspect that may vary among embodiments of these techniques relates to a delayed allocation of capacity. For example, upon receiving a request to create a space 108, a storage device set 102 may promptly allocate the entire provisioned capacity 110 of the space 108 on one or more storage devices 104. However, this allocation may take a while, particularly if the provisioned capacity 110 is large and a large number of extents 106 have to be selected and located, and such prompt allocation may significantly delay the fulfillment of the request to create the space. Additionally, this allocation may be inefficient if the capacity of the space 108 is not promptly thereafter, since extents 106 that have been allocated for the space 108 may remain empty, and yet may be unavailable for allocation to other spaces 108, or even to alleviate an exhaustion of the available capacity of the storage device set 102. Moreover, in a thin provisioning scenario, the provisioned capacity for the space 108 may not be available for allocation at the time that the space 108 is created. In view of these and other considerations, it may be advantageous to configure the storage device set 102 not to allocate the entire provisioned capacity 110 for the space 108 upon creating the space, but to delay the allocation until the physical capacity is to be utilized. For example, the storage device set 102 may initially allocate a small number of extents 106 to the space 108 in order to provide starting physical capacity (or may refrain from doing so), and may wait to allocate additional physical capacity until demand for the physical capacity arises.

A first variation of this third aspect involves the manner of achieving the delayed allocation of capacity. As a first example, the storage device set 102 may monitor the available physical capacity allocated to a space 108, and when the available physical capacity nears exhaustion (while provisioned capacity 110 remains), the storage device set 102 may automatically allocate one or more new extents 106 and associate such extents 106 with the space 108, thereby avoiding exhaustion of the physical capacity of the space 108. This variation may therefore opaquely handle the allocation of capacity for a space 108, and may not even indicate that less than all capacity has been allocated for the space 108. As a second example, the storage device set 102 may expose the incomplete allocation of physical capacity to an administrator 314 or process, and may accept and fulfill requests from the administrator and/or process to expand the physical capacity allocated for the space 108. As a third example, respective extents 106 may be bound to a logical address range of the space. A request to access data may specify a location in the space, and the storage device set 102 may determine whether any extent 106 associated with the space 108 is bound to an address range including the location of the request. If not, the storage device set 102 may bind an unbound extent 106 to a logical address space the space 108, where the logical address range includes the location of the access, in order to provide the physical capacity for the access. The unbound extent 106 may be newly allocated for the space 108 on a storage device 104 in order to fulfill the request. Alternatively, the unbound extent 106 may have been allocated for the space 108 before the access, but may not yet have been bound to a logical address range for the space 108. For example, when a space 108 is created, it may be difficult to predict the locations within the space 108 that are to be used first. Therefore, a number of extents 106 may be allocated for and associated with the space 108, but may not be bound to any logical address range until the first access requests are received specifying logical locations within the space 108. In this manner, the allocation of unbound extents 106 may provide readily available physical capacity for any portion of the space 108, even though only a portion of the provisioned capacity 110 has been physically allocated, and even though the locations within the space 108 that are to be used cannot be predicted. In accordance with the techniques presented herein, the allocation of extents 106 may be achieved through the allocation strategies presented herein.

As a second variation of this third aspect (and as illustrated in the exemplary scenario 500 of FIG. 5), the storage device set 102 may enable the use of capacity reservations 504 for respective spaces 108 in order to provide physical capacity for the space 108 in the event of an exhaustion of available capacity of the storage device set 102. For example, when a capacity reservation 504 is requested for a space 108, the storage device set 102 may calculate, for respective storage devices 104, a capacity reservation size comprising a lesser of the remaining provisioned capacity 110 of the space 108 and a capacity reservation portion 506 of the capacity reservation 504 for the space 108 on the storage device 104. (This comparison enables the capacity reservation 504 to extend up to the remaining provisioned capacity 110 of the space 108 without exceeding the remaining provisioned capacity 110 of the space 108.) The storage device 104 may therefore reduce the available capacity by the capacity reservation size. The capacity reservation may be specified with the request to create the space 108 or may be added after the space is created 108, and may be adjusted to variable capacity reservation sizes after creation by adjusting the reserved capacity portions 506 on respective storage devices 104.

As a third variation of this second aspect, for a space 108 having a capacity reservation 504, the storage device set 102 may consume the capacity reservation 504 for the space 108 in various ways while the storage device set 102 has available physical capacity. For example, requests to expand the physical capacity for the space 108 may be achieved by maintaining the capacity reservation 504 and reducing the available capacity of the storage device set 102 (e.g., satisfying such capacity allocations from the general pool of available capacity); by maintaining the available capacity of the storage device set 102 and reducing the capacity reservation 504 of the space 108 (e.g., satisfying such capacity allocations from the capacity reservation 504 for the space 108); or a combination thereof (e.g., a request may specify a capacity reservation 504 of 50% of the remaining provisioned capacity 110 of a space 108, and capacity allocations may be satisfied by reducing both the available capacity of the storage device set 102 and the capacity reservation 504 for the space 108). Alternatively or additionally, the storage device set 102 may (or may not) restrict the size of a capacity reservation 504 to the remaining provisioned capacity 110 for the space 108. For example, the storage device set 102 may always satisfy capacity requests from the capacity reservation 504 of a space 108 (instead of from the available capacity of the storage device set 102) if the remaining provisioned capacity 110 for the space 108 otherwise exceeds the size of the capacity reservation 504. Alternatively, for particularly high-priority spaces 108, the storage device set 102 may allow the capacity reservation 504 to exceed the remaining provisioned capacity 110 of the space 108 in case a request to expand the space 108 is received while the available capacity of the storage device set 102 is exhausted.

As a fourth variation of this third aspect, the storage device set 102 may take various actions upon reaching exhausting the available capacity of the storage devices 104, or upon approaching exhaustion (e.g., upon reducing the available capacity of the storage devices 102 below an available capacity minimum threshold). For example, the storage device set 102 may notify an administrator 314 or other user of the current or imminent exhaustion; may recommend the addition of one or more storage devices 104 to expand the capacity of the storage device set 102; or may, in some scenarios, automatically place an order for additional storage. The storage device set 102 may also identify one or more spaces 108 that may be reduced in order to provide capacity to alleviate the exhaustion, and may, e.g., recommend switching a fully allocated space 108 to an overprovisioned space 108. For example, a space 108 may be bound to extents 106 that are not in use (e.g., extents 106 for a fully allocated space 108 that is only partially filled, or extents 106 that were bound to an extent 108 but have since not been used), and may recommend a deallocation of such extents 106 or a reallocation to a space 108 having higher priority 302. Those of ordinary skill in the art may devise many variations in the delayed allocation and thin provisioning of the storage device set 102 in accordance with the techniques presented herein.

D4. Additional Features

A fourth aspect that may vary among embodiments of these techniques relates to additional features that may be provided by such embodiments. As a first variation of this fourth aspect, the available capacity minimum threshold may be selected in various ways, e.g., according to a heuristic based on the characteristics of the storage device set 102 or the data stored therein; may be specified as an absolute number (e.g., a total number of remaining extents 106) or as a relative number (e.g., at least 10% of the total physical capacity remaining available); and may be specified as one value for all storage devices 104 or may be particularly selected for each storage device 104. Additionally, the available capacity minimum threshold may be adjusted over time, e.g., according to the available capacities of the storage devices 104 of the storage device set 102.

As a second variation of this fourth aspect, the allocation of capacity may encounter difficulty if a storage device 104 is temporarily unavailable, e.g., if the storage device 104 is accessible over a network connection that is temporarily disconnected, or if the storage device 104 has failed and is being replaced. While the temporary nature of the unavailability may preclude removing the storage device 104 from the representation, the allocation techniques may have to be adjusted in response. For example, the instructions may simply exclude the storage device 104 from any storage device subset selected for the allocation of capacity. Alternatively, even though the storage device 104 is unavailable, it may nevertheless be selected for capacity allocation if the storage device set 102 redundantly stores the data over multiple storage devices 104. As a first example, if the allocation is requested for a pool 114 of capacity comprising a mirror, the unavailable storage device 104 may be included in the pool, and the redundant data may simply be copied onto it once the unavailable storage device 104 is reconnected. As a second example, if the storage device set 102 provides redundancy in the form of a checksum, the data on the unavailable storage device 104 may be reconstructed through the use of data on the other storage devices 104. However, this data may include not only data that existed on the unavailable storage device 104, but data that was requested to be written to the storage device 104 after it became unavailable. That is, the storage device set 102 may select an unavailable storage device 104 for allocation, and may even operate as if storing new data on the unavailable storage device 104, but may simply update the other information of the storage device set 102 accordingly (e.g., updating a checksum stored in a checksum area to indicate the data that is to be stored on the storage device 104 when reconnected). Data may similarly be "read" from the unavailable storage device by using the corresponding data on the other storage devices 104. When the unavailable storage device 104 becomes available (either as a reconnection of the storage device 104 or a replacement with a new but empty storage device 104), a resynchronization or reconstruction of the data therefore yields ensures that this storage device 104 contains not only the data that was stored on the storage device 104 at the time of disconnection, but the data that was requested to be written to the storage device 104 after disconnection. In this manner, even unavailable storage devices 104 may be included in the allocation strategies presented herein. Those of ordinary skill in the art may devise many additional features that are compatible with the techniques presented herein.

E. Computing Environment

Figure 10:
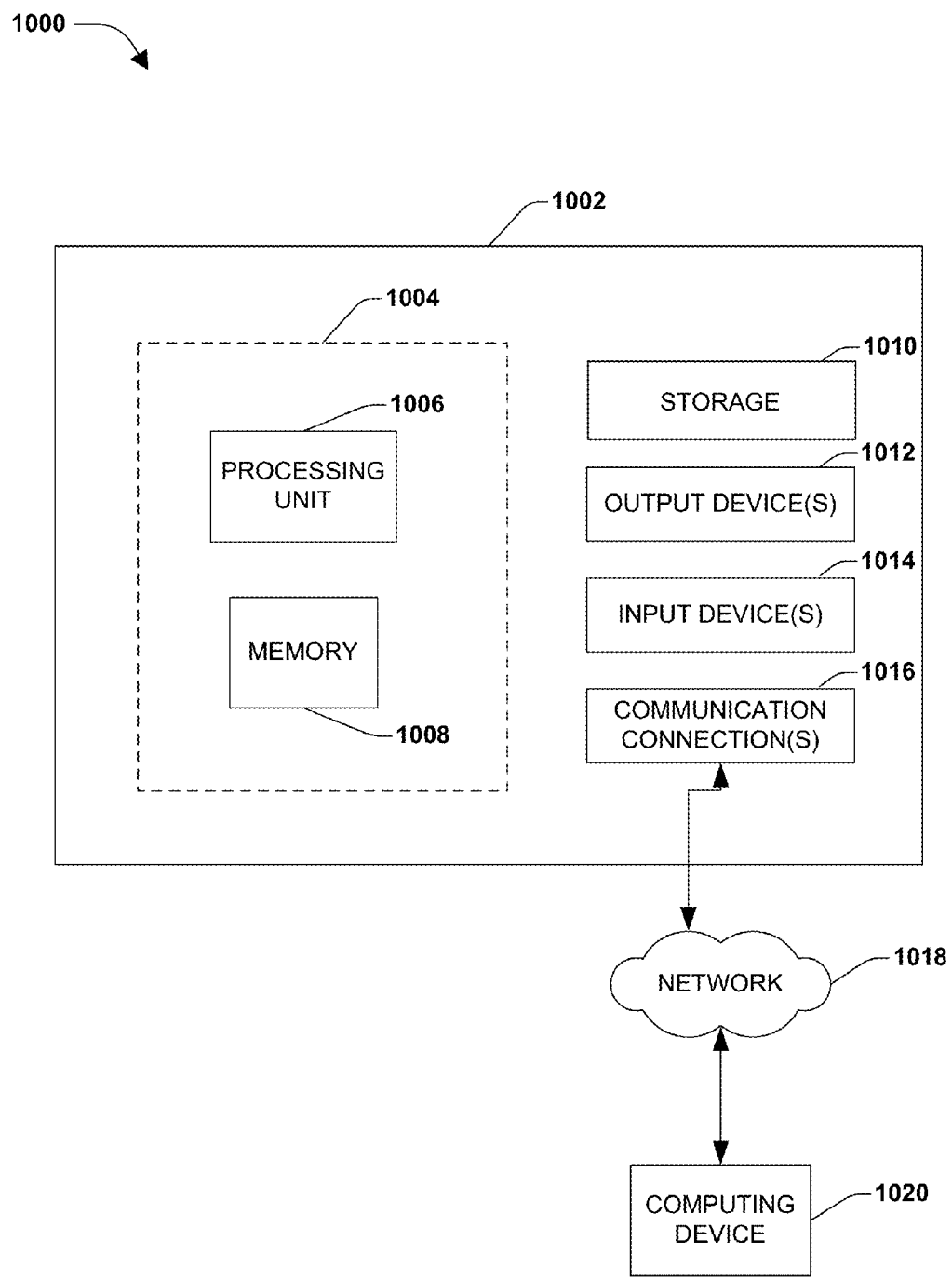
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1040 accessible via network 1018 may store computer readable instructions to implement one or more embodiments provided herein. Computing device 1002 may access computing device 1040 and download a part or all of the computer readable instructions for execution. Alternatively, computing device 1002 may download pieces of the computer readable instructions, as needed, or some instructions may be executed at computing device 1002 and some at computing device 1040.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of allocating capacity for spaces on a storage device set comprising at least two storage devices accessible to a device having a processor, the method comprising:
   executing on the processor instructions configured to, upon receiving a request to allocate capacity for a space:
      among the storage devices, identify a spacious storage device subset comprising storage devices having available capacity above an available capacity minimum threshold;
      allocate capacity for the space on the storage devices of the spacious storage device subset; and
      if the spacious storage device subset does not satisfy the request:
         among remaining storage devices, identify a limited storage device subset comprising storage devices having available capacity below the available capacity minimum threshold; and
         allocate capacity for the space on the storage devices of the limited storage device subset.

2. The method of claim 1, allocating capacity on the storage devices of a storage device subset comprising:
   identifying a sequence of storage devices of the storage device subset according to a round-robin selection;
   for respective storage devices and according to the sequence:
      allocating an extent on the storage device, and
      associating the extent with the space,
   until a total capacity of the extents associated with the space satisfies the request.

3. The method of claim 2:
   the storage devices of a storage device subset having a storage device order; and
   the round-robin selection comprising: for a second request following a first request:
      identifying a last storage device on which capacity was allocated for the first request;
      identifying a next storage device following the last storage device according to the storage device order; and
      allocating capacity on the storage devices according to the storage device order and beginning with the next storage device.

4. The method of claim 1, allocating capacity on the storage devices of a storage device subset comprising:
   among the storage devices of the storage device subset, identify a sequence descendingly ordering the storage devices by available capacity; and allocating capacity on the storage devices according to the sequence.

5. The method of claim 1, allocating capacity on the storage devices of a storage device subset comprising:
among the storage devices of the storage device subset, identify a sequence ascendingly ordering the storage devices by access rate; and
allocating capacity on the storage devices according to the sequence.

6. The method of claim 5:
the instructions configured to track the access rates of the storage devices as an access rate history; and
identifying the sequence comprising: upon receiving the request to allocate capacity for the space, sorting the storage devices according to the access rate history.

7. The method of claim 1, the request specifying a storage device distribution constraint selected from a storage device distribution constraint set comprising:
a number of different storage devices;
for storage devices having a storage device type, a number of different storage device types; and
for storage devices located in different locations, a number of different locations of the storage devices.

8. The method of claim 1:
respective spaces created with a provisioned capacity;
respective spaces bound to extents respectively having an extent capacity;
the request comprising a request to access a location in the space that is not bound to an extent; and
allocating capacity for the space on a storage device comprising:
binding an extent allocated on the storage device to a logical address range of the space including the location.

9. The method of claim 1:
before the access, the storage device comprising at least one unbound extent allocated for the space and not bound to a logical address range of the space; and
binding the extent comprising: binding an unbound extent to the logical address range of the space including the location.

10. The method of claim 9, the provisioned capacities of the spaces exceeding the capacity of the storage devices of the storage device set.

11. The method of claim 10, the instructions configured to, for at least one space:
identify a capacity reservation; and
for respective storage devices:
calculate a capacity reservation size comprising a lesser of:
a remaining provisioned capacity of the space, and
a capacity reservation portion of the capacity reservation for the space on the storage device; and
reduce the available capacity of the storage device by the capacity reservation size.

12. The method of claim 11, allocating the capacity reservation for a space comprising: upon receiving a request to create a space having a provisioned capacity and a capacity reservation size:
create the space with the provisioned capacity; and
reserve a capacity reservation of the capacity reservation size for the space on at least one storage device.

13. The method of claim 11, allocating an extent on a storage device for a space comprising: upon allocating an extent for the space, reduce the capacity reservation portion of the reservation capacity for the space on the storage device.

14. The method of claim 13, reducing the capacity reservation portion comprising:
reducing the capacity reservation portion of the reservation capacity for the space on the storage device if:
the remaining provisioned capacity of the space exceeds the capacity reservation portion on the storage device; or
the storage device has no available capacity.

15. The method of claim 10, comprising: upon reducing the available capacity of the storage devices of the storage device set below an available capacity minimum threshold, notify an administrator of the available capacity of the storage device set.

16. The method of claim 1, the instructions configured to adjust the available capacity minimum threshold according to the available capacities of the storage devices of the storage device set.

17. The method of claim 1:
the storage device set including at least one unavailable storage device; and
the instructions configured to exclude the unavailable storage device from storage device subsets.

18. The method of claim 1:
the storage device set configured to store data redundantly across at least two storage devices;
the storage device set configured to satisfy accesses to data on an unavailable storage device by accessing redundantly stored data on other storage devices of the storage device set;
the storage device set including at least one unavailable storage device; and
allocating capacity for a space on an unavailable storage device comprising:
allocating the capacity on the unavailable storage device; and
satisfying accesses to the data within the capacity of the unavailable storage device by accessing redundantly stored data on other storage devices of the storage device set.

19. A method of allocating capacity for spaces on a storage device set comprising at least two storage devices accessible to a device having a processor, the method comprising:
sending to the device instructions that, when executed by the processor, cause the device to:
upon receiving a request to create a space with a provisioned capacity and a capacity reservation:
create the space, and
for respective storage devices, reserve a capacity reservation portion for the space; and
upon receiving a request to allocate capacity for the space:
among the storage devices, identify a spacious storage device subset comprising storage devices having available capacity above an available capacity minimum threshold;
for respective storage devices of the spacious storage device subset, allocate at least one extent for the space on the storage devices of the spacious storage device subset;
adjust the capacity reservation portion of the capacity reservation for the space; and
if the spacious storage device subset does not satisfy the request:
among remaining storage devices, identify a limited storage device subset comprising storage devices having available capacity below the available capacity minimum threshold; and
allocate capacity for the space across the limited storage device subset; and adjust the capacity reservation portion of the capacity reservation for the space.

20. A computer-readable storage medium comprising instructions that, when executed on a processor of a device having access to a storage device set comprising at least two storage devices, allocates storage for respective spaces by:
  upon receiving a request to create a space with a provisioned capacity and a capacity reservation:
    creating the space;
    for respective storage devices, calculating capacity reservation size comprising a lesser of:
      a remaining provisioned capacity of the space, and
      a capacity reservation portion of the capacity reservation for the space on the storage device; and
    reducing the available capacity of the storage device by the capacity reservation size;
  upon receiving a request to allocate capacity for a space, the provisioned capacities of the spaces exceeding the capacity of the storage devices of the storage device set, and the request specifying a storage device distribution constraint selected from a storage device distribution constraint set comprising:
    a number of different storage devices;
    for storage devices having a storage device type, a number of different storage device types; and
    for storage devices located in different locations, a number of different locations of the storage devices, allocating capacity by:
      among the storage devices, identifying a spacious storage device subset comprising storage devices having available capacity above an available capacity minimum threshold;
      allocating capacity for the space on the storage devices of the spacious storage device subset; and
      if the spacious storage device subset does not satisfy the request:
        among remaining storage devices, identifying a limited storage device subset comprising storage devices having available capacity below the available capacity minimum threshold; and
        allocating capacity for the space across the limited storage device subset;
    wherein allocating at least one extent on a storage device subset comprises:
      identifying a sequence of storage devices of the storage device subset according to a round-robin selection, comprising, for a second request following a first request:
        identifying a last storage device on which capacity was allocated for the first request; and
        identifying a next storage device following the last storage device according to the storage device order; and
      for respective storage devices and according to the sequence beginning with the next storage device:
        allocating an extent on the storage device,
        associating the extent with the space,
        binding the extent to a logical address range of the space, and
        if the remaining provisioned capacity of the space exceeds the capacity reservation portion on the storage device and the storage device has no available capacity, reducing the capacity reservation portion of the reservation capacity for the space on the storage device,
      until a total capacity of the extents associated with the space satisfies the request;
    adjusting an available capacity minimum threshold according to the available capacities of the storage devices of the storage device set; and
    upon reducing the available capacity of the storage devices of the storage device set below the available capacity minimum threshold, notify an administrator of the available capacity of the storage device set.

* * * * *